Aug. 24, 1937.  A. KINGSBURY  2,091,207
THRUST MEASURING DEVICE
Filed March 25, 1933    8 Sheets-Sheet 6
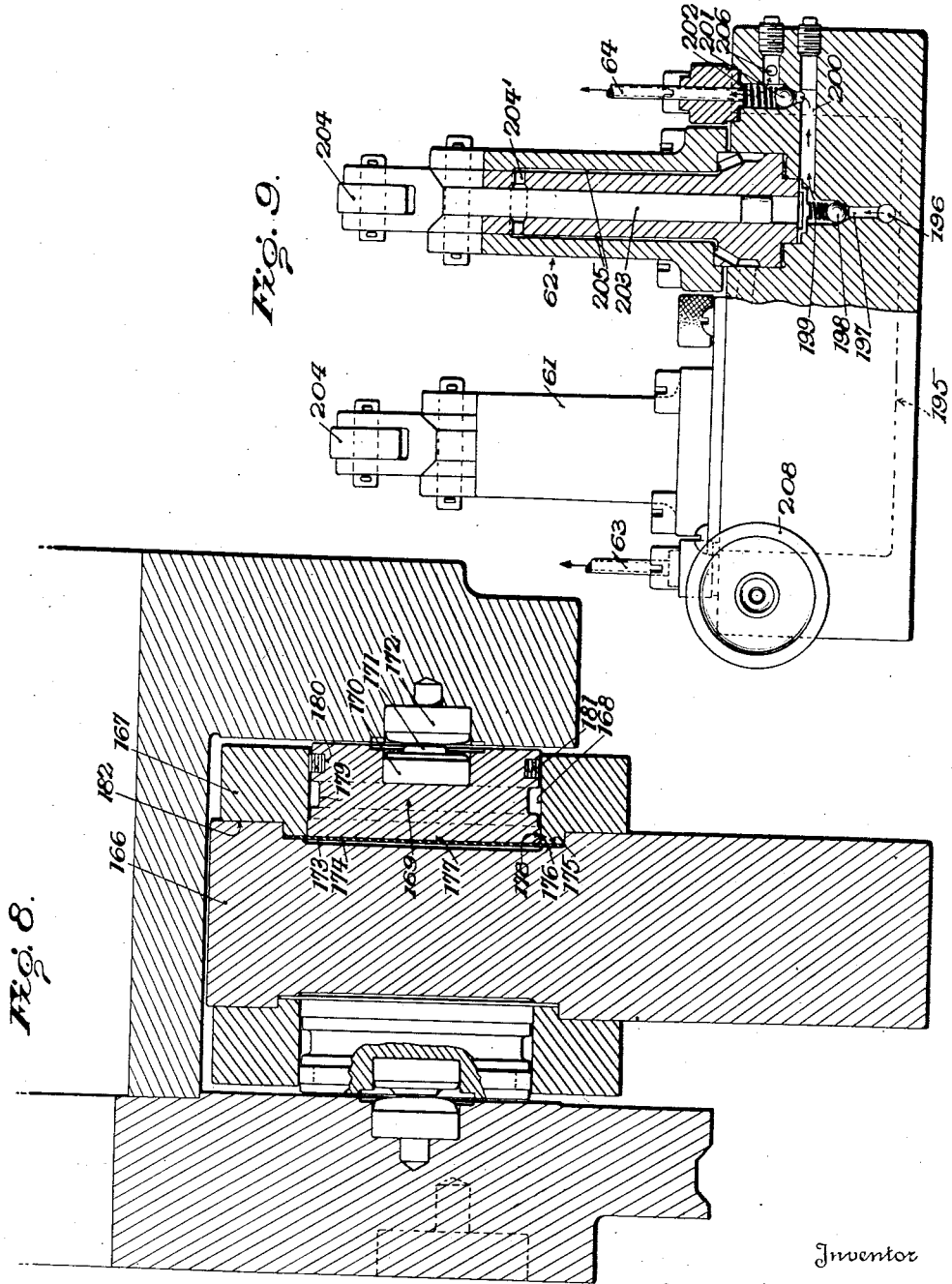
Inventor
Albert Kingsbury
By Cameron, Kerkam + Sutton
Attorneys.

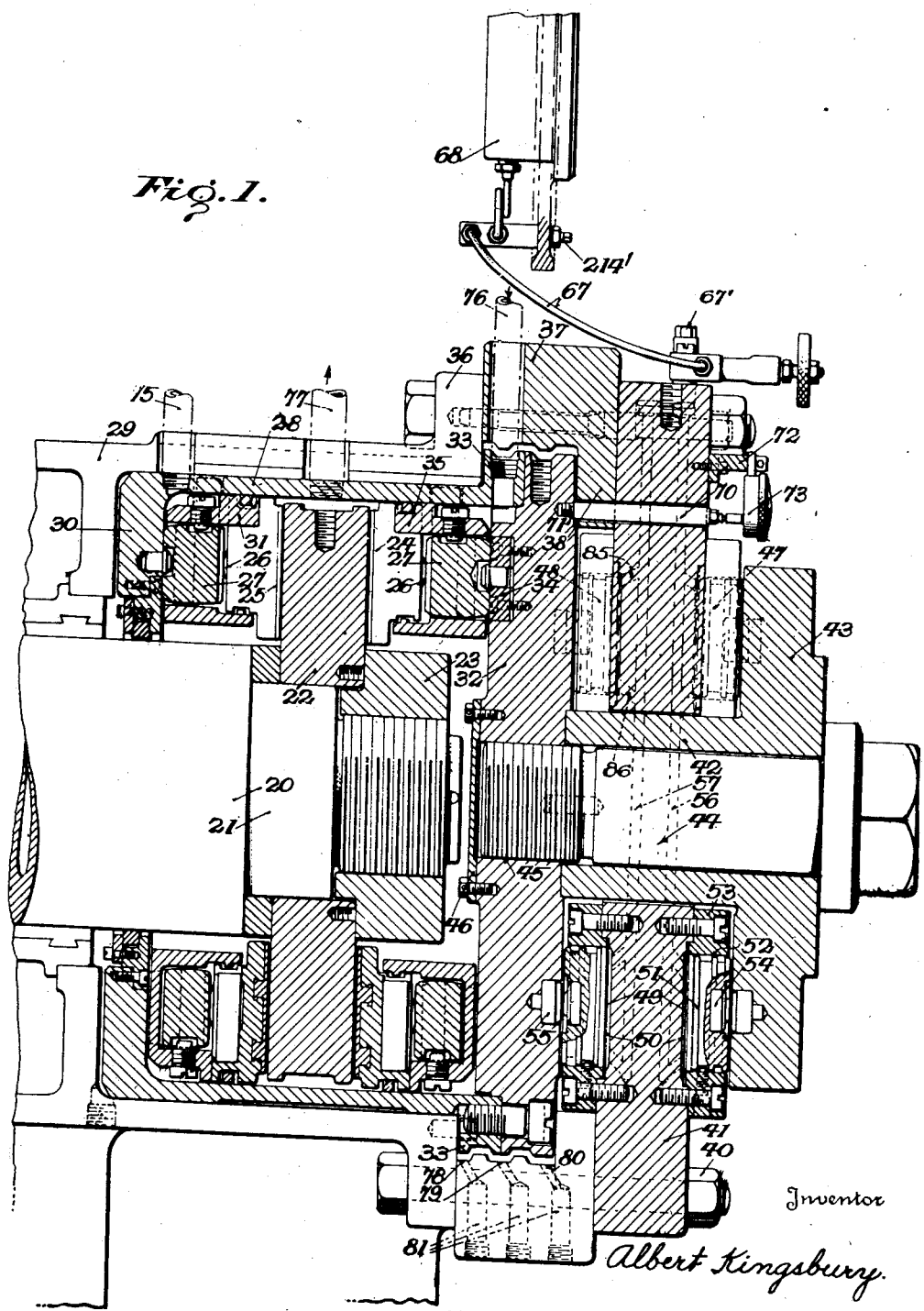

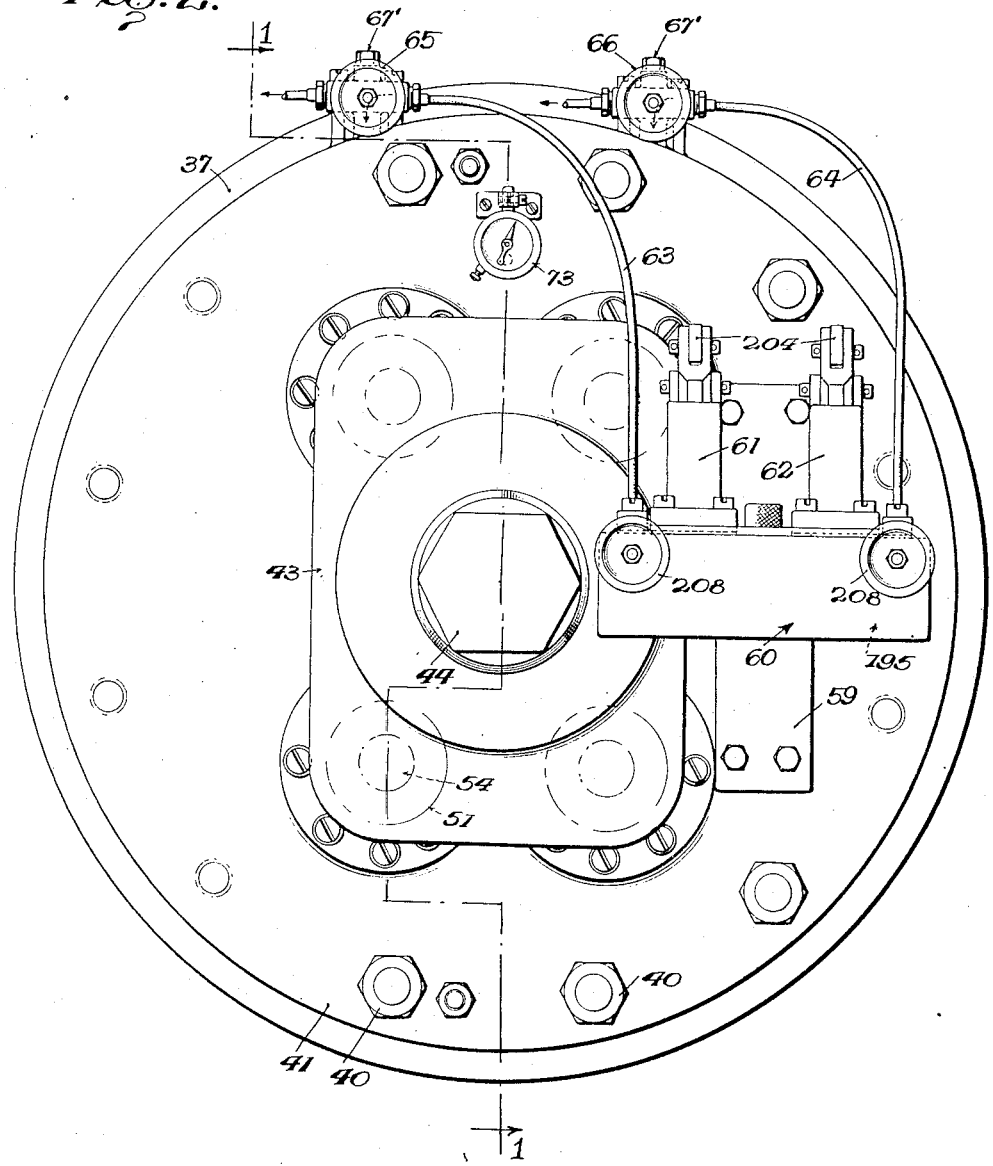

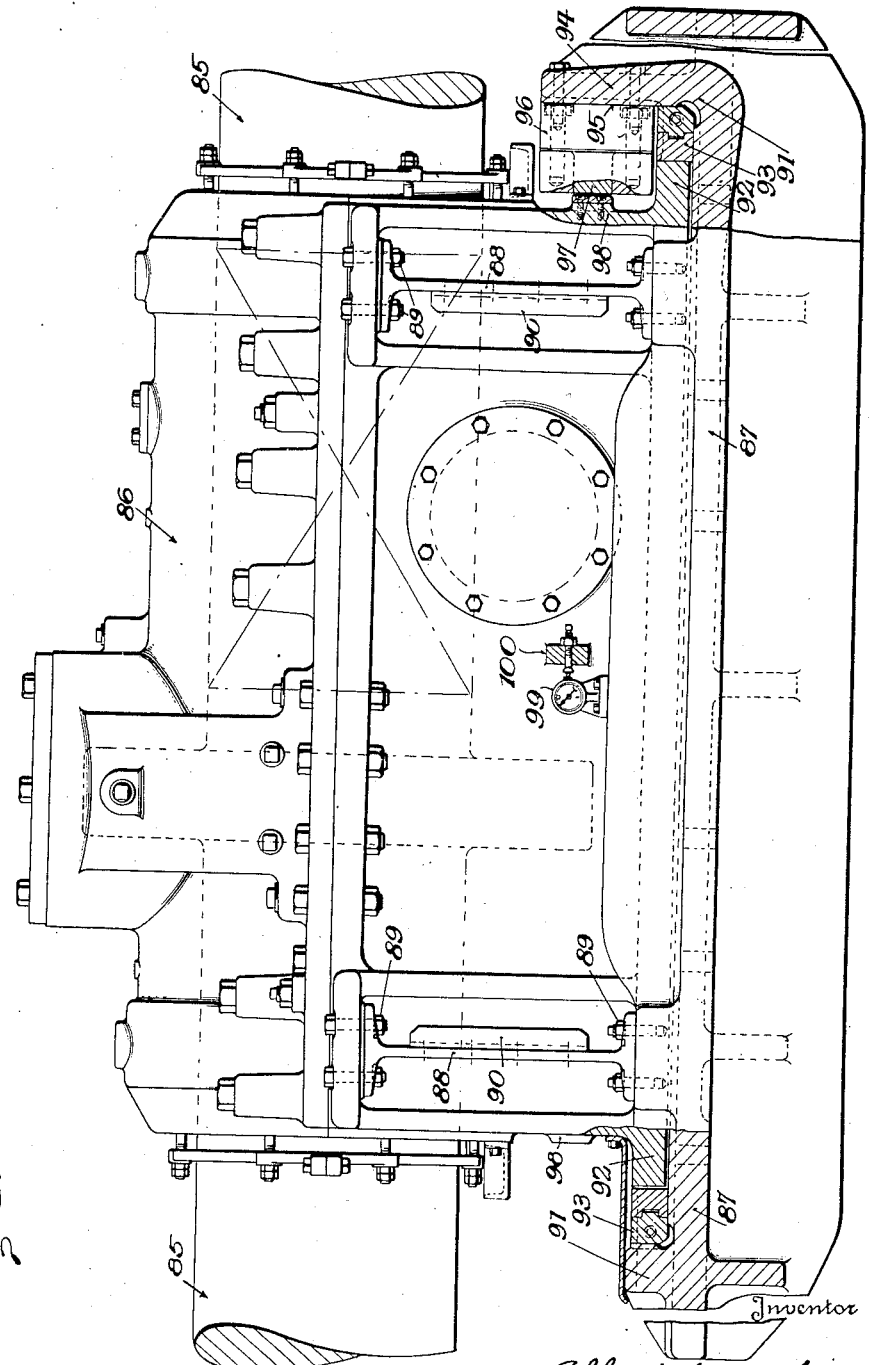

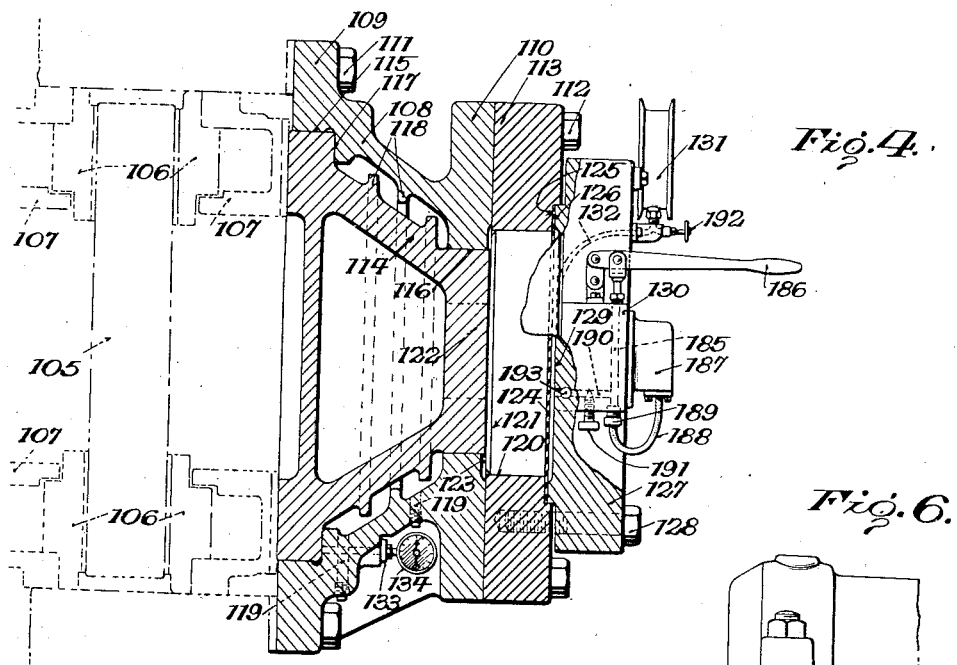
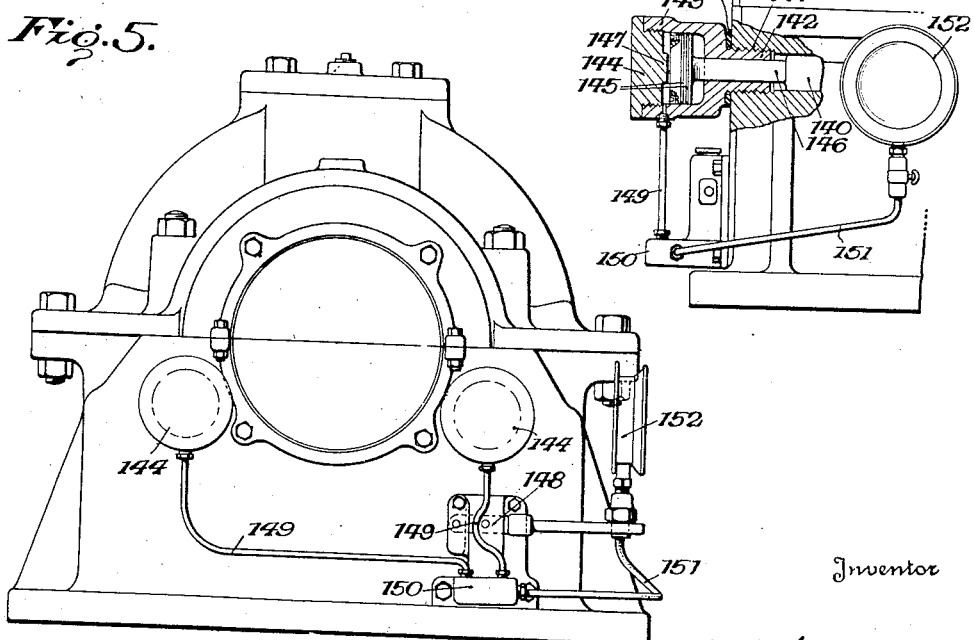

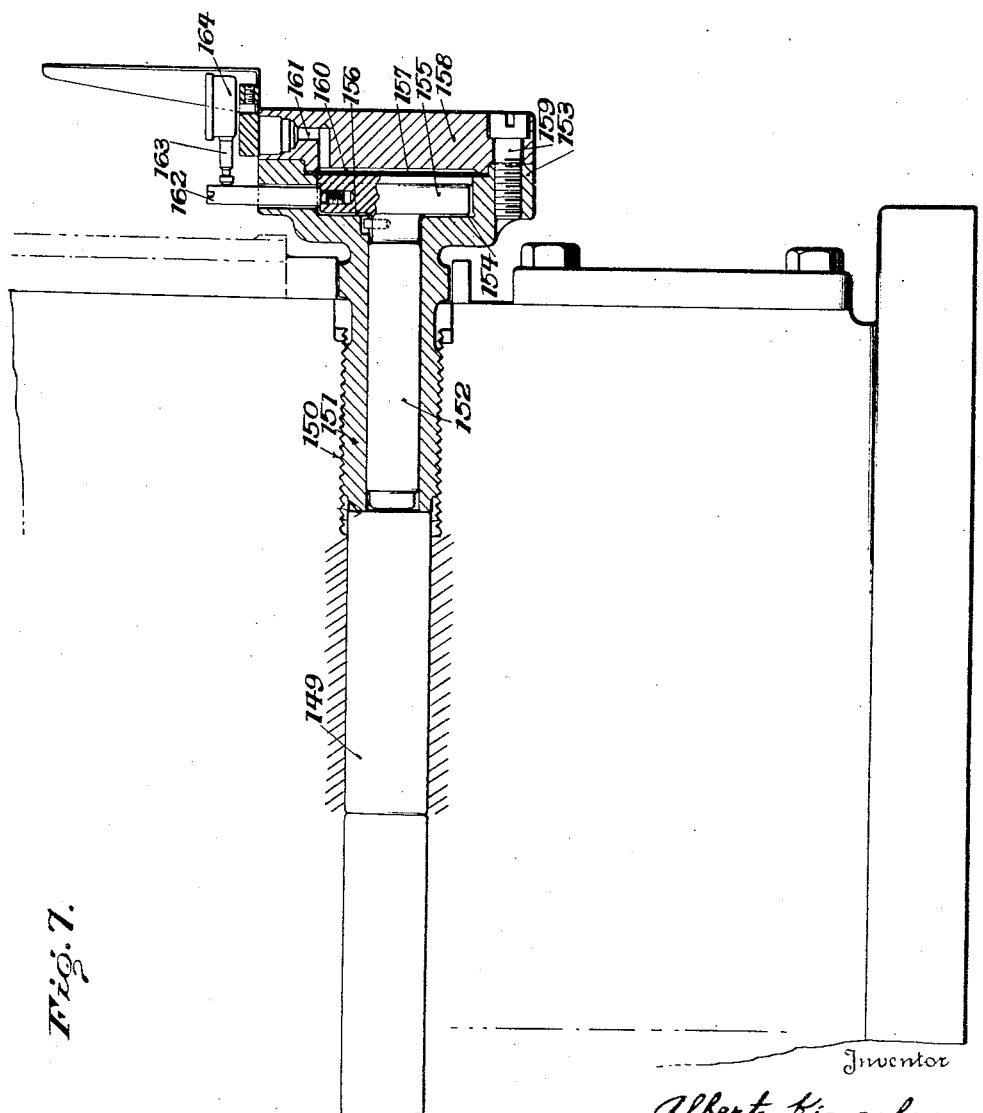

Aug. 24, 1937.  A. KINGSBURY  2,091,207
THRUST MEASURING DEVICE
Filed March 25, 1933  8 Sheets-Sheet 7
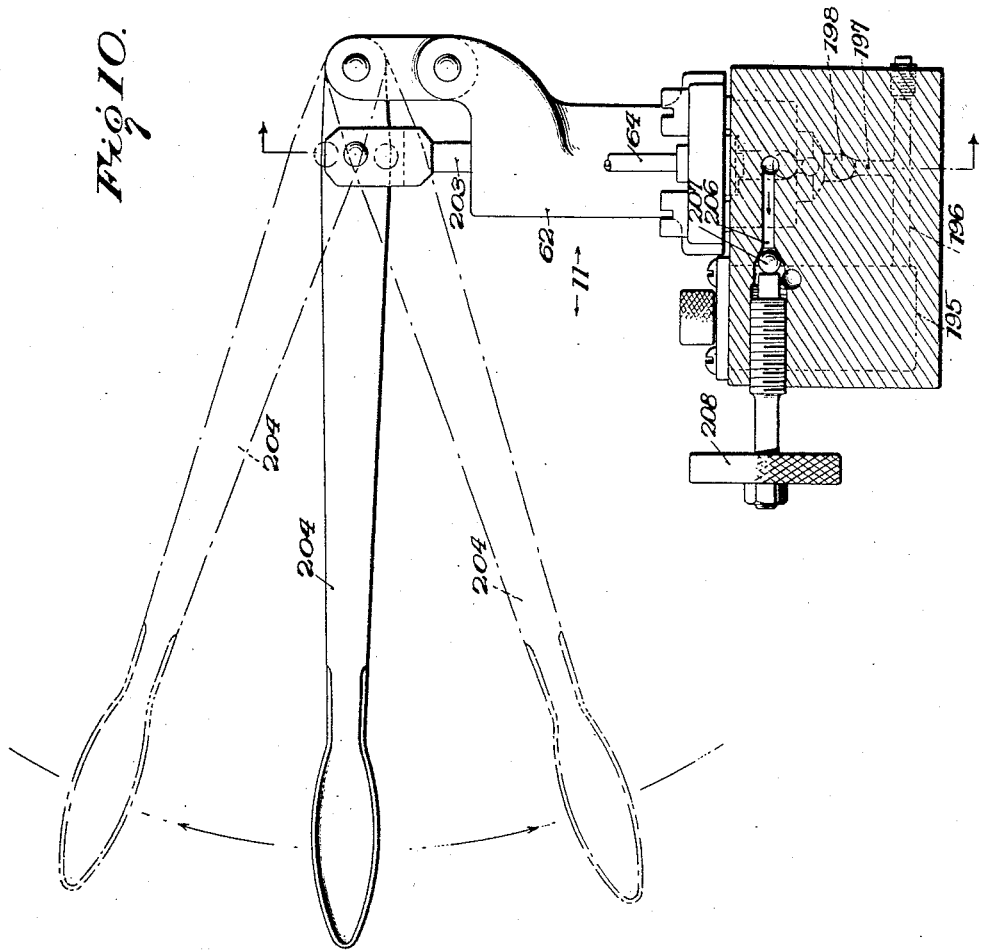
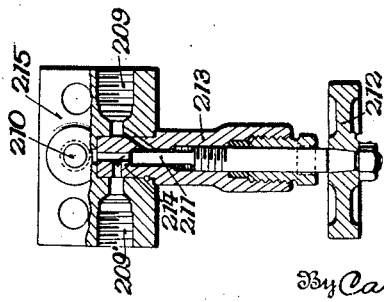
Inventor
Albert Kingsbury
By Cameron, Kerkam & Sutton
Attorneys

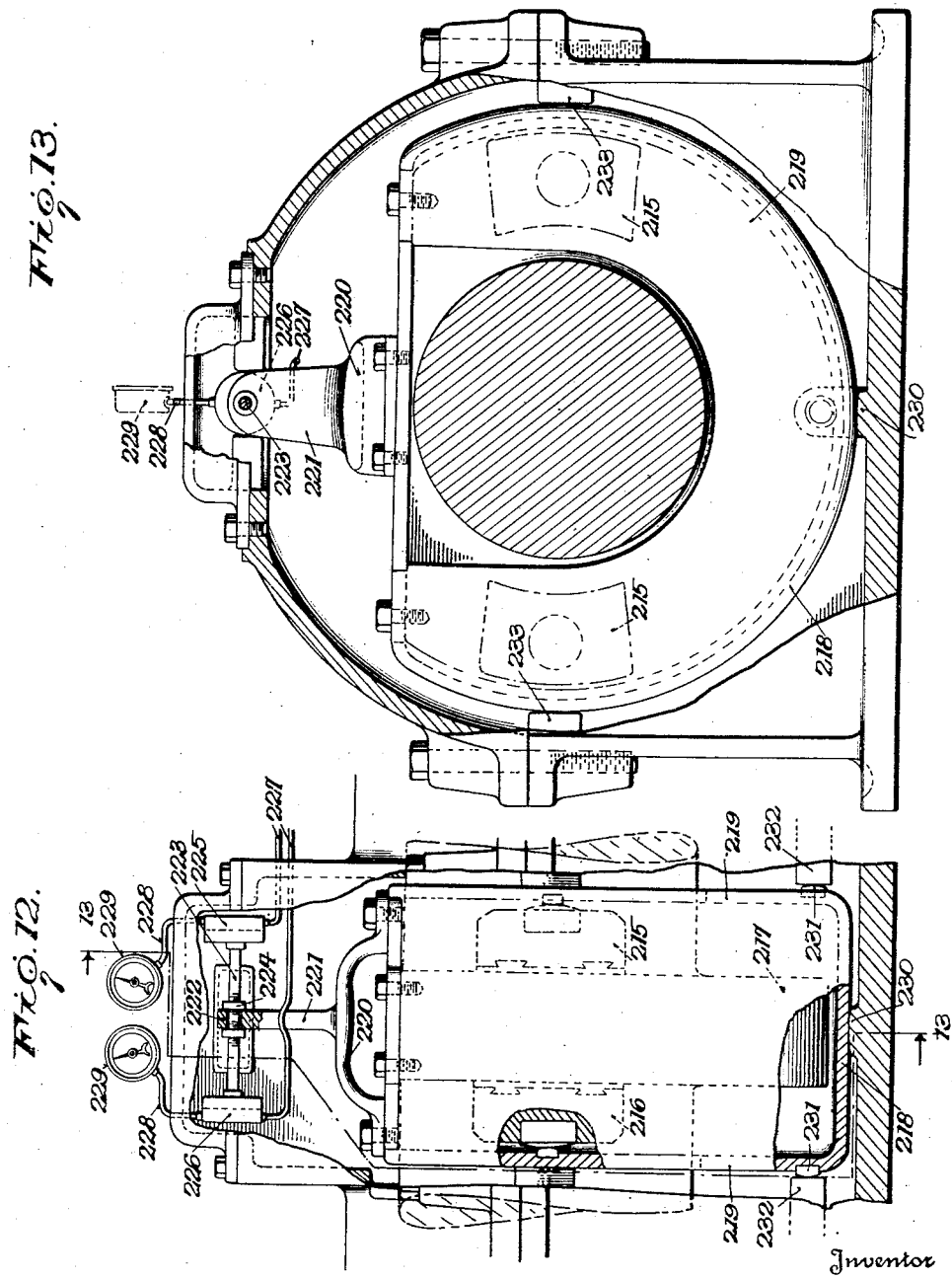

Patented Aug. 24, 1937

2,091,207

UNITED STATES PATENT OFFICE 2,091,207

THRUST MEASURING DEVICE

Albert Kingsbury, Greenwich, Conn., assignor to Kingsbury Machine Works, Inc., Philadelphia, Pa., a corporation of Delaware Application March 25, 1933, Serial No. 662,769

67 Claims. (Cl. 265—47)

This invention relates to thrust measuring devices and more particularly to devices for measuring the thrust of thrust bearings designed to sustain relatively heavy loads.

It is an object of this invention to provide a thrust bearing with an improved thrust measuring device which can be employed at will to measure the thrust and which will not interfere with the normal and proper operation of the thrust bearing whether or not it is in operation.

Another object of this invention is to provide a novel thrust measuring device for thrust bearings which can be readily put into and out of operation and which, when not in operation, will permit the thrust bearing to function as if no thrust measuring device were associated therewith.

Another object of this invention is to provide a novel thrust measuring device which takes the form of a readily removable unit for application to a thrust bearing.

Another object of this invention is to provide a novel thrust measuring device which can be readily applied to existing bearings as well as installed in new bearings.

Another object of this invention is to provide a thrust measuring unit which can be readily applied to and used with a wide variety of thrust bearings and which will measure the thrust with extreme accuracy.

Another object of this invention is to provide a novel thrust measuring device which will interequalize the pressure existing on a plurality of thrust receiving elements.

Another object of this invention is to provide a novel thrust measuring device which includes one or more hydrostatically operated cells which can be placed in operation at will for the purpose of measuring hydrostatically the pressure transmitted to said cells as a result of the normal operation of the thrust bearing.

Another object of this invention is to provide an improved fluid pressure responsive device for measuring thrust which is fluid-tight and which at the same time has a substantially uniform and relatively small resistance to the movement of the pressure responsive element thereof.

Another object of this invention is to provide an improved fluid pressure cell for a thrust measuring device which is of wide application and which can be used, in single or multiple units, with thrust bearings of a wide variety of constructions and in bearings employing different numbers and types of thrust receiving elements, and which also can be readily incorporated in a unit for application to and removal from a thrust bearing.

Another object of this invention is to provide a thrust measuring device employing hydrostatic pressure with improved means for developing, controlling and measuring the pressure existing in the fluid subjected to pressure.

Another object of this invention is to provide a thrust bearing with a thrust measuring device together with means for indicating whether or not the parts of the thrust bearing are in proper position for transmitting the thrust pressure to the measuring device.

Another object of this invention is to provide a thrust bearing with a thrust measuring device wherein all parts are properly lubricated and wherein different oils leaking from different parts of the structure are collected and kept separate for use over again.

Another object of this invention is to provide a thrust measuring device employing a rubber diaphragm and which is so constructed that oil from the bearing cannot reach the rubber diaphragm to injure the same.

Another object of this invention is to provide a thrust measuring device wherein any deflection or distortion of the parts has a minimum effect on the indicated pressure.

Another object of this invention is to provide a thrust measuring device which may utilize the movement of the thrust bearing housing under the sustained load to indicate the magnitude of the thrust pressure.

Another object of this invention is to provide a thrust measuring device that may be applied individually to each of several thrust receiving elements or which may be used to measure the thrust as applied to an element that sustains a known fraction of the entire thrust.

Another object of this invention is to provide a thrust measuring device wherein the thrust receiving and measuring elements are restrained as to the magnitude of their movements so that damage cannot result to the parts of the thrust bearing in the event that through breakage or otherwise said thrust measuring elements fail to sustain the load.

Another object of this invention is to provide a horizontal thrust bearing with thrust measuring devices which may separately measure the thrust in either direction or which may be used simultaneously, if desired, to measure the thrust in both directions.

Another object of the invention is to provide a horizontal thrust bearing with novel thrust measuring means which will accurately measure the net thrust pressure or actual externally applied load.

Another object of this invention is to provide a thrust measuring device which is relatively simple and rugged in construction, and certain and durable in operation, and one which can be readily standardized for use in bearings of different sizes and constructions.

Other objects of the invention will appear as the description of the invention proceeds.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures—

Fig. 1 is an axial section of a double acting horizontal thrust bearing provided with a thrust measuring device embodying the present invention, the section through the lower shoes and equalizing means being taken on a somewhat different radial plane from the upper to show the construction more clearly;

Fig. 2 is an end view of the thrust measuring device with its associated pumps, pressure connections and cooperating parts;

Fig. 3 is an axial view of another embodiment of the present invention;

Fig. 4 is an axial section of another embodiment of the present invention using a single cell for indicating thrust in a single direction;

Fig. 5 is an end view of another embodiment of the present invention;

Fig. 6 is a central sectional view of the pressure cell of Fig. 5;

Fig. 7 is a central sectional view of another pressure responsive cell which may be used in place of a jackscrew;

Fig. 8 is an enlarged fragmentary section to illustrate the preferred construction of a pressure cell in greater detail;

Fig. 9 is an elevation, partly in section, illustrating the construction of the preferred form of pump;

Fig. 10 is a section at right angles to Fig. 9 illustrating certain of the passages and valves employed;

Fig. 11 is a sectional detail of one of the manually controlled pressure retaining valves; and Figs. 12 and 13 are respectively an elevation and a transverse section of a horizontal thrust bearing embodying the present invention and illustrating one means whereby the net thrust pressure in either direction can be measured, the latter being taken on line 13—13 of Fig. 12.

Referring first to the embodiments of Figs. 1 and 2, the shaft 20 is shown as provided with a portion 21 of reduced diameter on which a thrust collar 22 is secured, non-rotatably with respect thereto, in any suitable way and suitably retained on the shaft as by a nut 23 threaded onto the extremity thereof. The thrust bearing illustrated is adapted to take the thrust in opposite directions, and to this end a suitable number of thrust receiving shoes or segments 24 and 25 are suitably mounted for cooperation with the opposed faces of said thrust collar. Said shoes or segments may be of any suitable construction and may be mounted in any suitable way. As shown, said shoes are provided with projections 26 whereby said shoes may be mounted to tilt both radially and circumferentially in conformity with the principle of the Kingsbury thrust bearing. Said shoes may also be supported in any suitable way, being shown as mounted on equalizing structures composed of a circumferential series of bridged tiltable equalizing blocks 27, alternate blocks of the series being tiltably mounted for rocking movement on a base and the intermediate members of said series tiltably supporting the respective shoes in conformity with the principle disclosed in Kingsbury Patent No. 1,361,073, granted December 7, 1920. It is to be expressly understood, however, that the details of construction of the thrust bearing constitute no part of the present invention, and that the thrust bearing elements may be composed of rigid or flexible rings or flexibly connected segments as well as separate relatively rigid shoes, and that said thrust bearing elements may be mounted in any suitable way, as by means of adjustable jackscrews, spherically faced or other forms of equalizing structures or without provision for equalization, without departing from the present invention.

As shown the thrust collar 22 with its associated shoes 24 and 25 and equalizing means 27 is surrounded by a cylindrical cage 28 which has a sliding fit within the bore of the bearing housing 29. Said cage 28, at its inner end, has a radially directed flange 30 which constitutes the base upon which the bridged series of equalizing members 27 for shoes 25 are mounted, a suitable cage ring 31 being illustrated for retaining the equalizing elements 27 in position. At its opposite extremity the cage structure is completed by a plate 32 suitably bolted to a radial and outwardly directed flange 33 on the cage 28. The inner face of plate 32 constitutes a base for the equalizing elements 27 of the shoes 24, and may be provided with adjustable blocks or inserts 34 for predetermining the position of the shoes with respect to the thrust collar and thereby the thickness of the oil films to be formed between the bearing surfaces. A cage ring 35 is also illustrated for retaining the latter equalizing elements in their proper position. The cage 28 and plate 32 constitute a plunger for transmitting net thrust as hereinafter explained.

Bolted to a flange 36 on the bearing housing is an end or spacing ring 37 which has an inwardly directed flange 38 adjacent to the outer face of the plate 32, said ring and flange being of sufficiently rigid construction so that in the normal operation of the bearing the thrust toward the right, as viewed in Fig. 1, can be transmitted through the right-hand shoes 24 and associated equalizing elements 27 to the plate 32 and the thrust on the latter be sustained by the flange 38 of the ring 37. The width of the cavity between the inner face of the flange 36 and the inner face of the flange 38 is slightly greater than the combined thicknesses of the flange 33 and plate 32, so that a predetermined movement of the cage 28 and its attached plate 32 may take place before said combined cage and plate are brought to rest against one or the other of the inner faces of said flanges 36 and 38. The magnitude of this relative movement, however, is preferably small, on the order of a clearance of .020″. When the thrust measuring device next to be described is not in place the bearing housing is completed by a cover which closes the aperture at the center of the flange 38 and completes an oil-tight housing for the thrust bearing, said cover being retained in position by bolts which may be the same bolts that are used for retaining in position the thrust measuring device now to be described.

In the embodiment shown in Figs. 1 and 2 a thrust measuring device, in the form of a readily removable unit, is attached in any suitable way to the bearing housing, as by bolts 40. As the thrust bearing here shown is a double acting bearing, the unit includes means for measuring the thrust in each direction, and therefore this embodiment includes both forward and rearward thrust measuring devices, each being shown as composed of a plurality of pressure cells. The thrust measuring unit as here illustrated comprises an annular plate-like base 41, which is mounted in position by the bolts 40, and a sleeve 42, provided with a flange 43, insertible through the central aperture of plate 41 and held in thrust receiving and transmitting relationship with the plate 32 in any suitable way, as by a bolt 44 threaded into an aperture 45 at the center of said plate 32. A cover plate 46 may be suitably secured over the opening 45 to prevent escape of oil therethrough.

Suitably secured to each of the faces of the base plate 41 are a plurality of pressure cells generally indicated at 47 and 48. These cells are preferably constructed as described hereinafter in more detail in conjunction with Fig. 8, but generally each cell includes a suitable diaphragm 49, preferably of rubber, suitably mounted so as to constitute a fluid-tight closure for a shallow chamber 50 at the rear of said diaphragm. Associated with each diaphragm is a rectilinearly movable plunger 51 which may move in the direction of its axis within the cylindrical bore 52 of a ring 53 suitably attached to the base ring 41. The plungers of the cells 48 are disposed for actuation by the plate 32, while the plungers of the cells 47 are disposed for actuation by the flange 43 of sleeve 42. As shown, each of the plungers may be provided with a block 54 having a spherically faced projection for engagement with a wear block 55 carried by the plate 32 or the flange 43, so that a point engagement is had between each plunger and its associated element for transmitting pressure therebetween.

Any suitable number of cells may be used in each of the forward and rearward sets. There may be as many cells for each direction of thrust as there are shoes in the thrust bearing for sustaining the corresponding thrust, or a fewer or larger number of cells may be employed. The cells of the forward and rearward sets may be in alinement, or they may be staggered, or different numbers of cells may be used in the two sets.

Formed within the base plate 41 are suitable passages 56 and 57 whereby a suitable fluid, such as castor oil, may be pumped into the chambers 50 closed by the diaphragms 49, each passage communicating with its cell at two or more points as shown in dotted lines so that air may escape from the upper duct 85 as oil flows in through the lower duct 86. Separate passages are provided for the cells of the forward and rearward sets, but all of the cells of each set intercommunicate so that the pressure between the cells in each set is interequalized through the communicating passages. Said passages are also so formed as to facilitate removal of the air.

Also suitably mounted on the base plate 41, in the form illustrated, as by a bracket 59, is a pump and manifold casing 60 hereinafter described more in detail, but generally including a pair of hand operated pumps 61 and 62 respectively communicating with the two sets of cells heretofore described and adapted to withdraw oil from a reservoir in the casing 60 and pump it through suitable piping 63 and 64 and suitable valve casings 65 and 66 to the respective inlets of the passages 56 and 57. Each valve casing is provided with a combined vent and filling hole closed by a cap 67'. Said passages 56 and 57 also respectively communicate through suitable pipes 67 with pressure indicators 68 of any suitable type and construction, but preferably of the Bourdon tube type, one gauge for each set of cells 47 and 48, although only one pressure indicator or gauge 68 with its communicating pipe 67 is illustrated in the drawings for the sake of simplification. All of the communicating pipes and passages are carefully designed to eliminate air pockets and avoid the lack of sensitive response to changes of pressure that would result if air pockets existed in the system. The gauges and all the communicating pipes and passages from the pumps to the cells and gauges, as well as the cells themselves, should be solidly full of air-free oil.

In order that the position of the plate 32 within its cavity may be determined from the exterior of the bearing housing, one or more connectors 70 are preferably passed through alined apertures in the base plate 41 and the flange 38, and suitably connected, as by a threaded connection at 71, to the plate 32. Mounted on the exterior of the base ring 41, as by a bracket 72, is an indicator 73 suitably attached to or associated with each connector 70. Therefore, by knowing the positions of the pointer on the indicator 73 when the plate 32 is in contact with the inner face of the flange 38 and when the flange 33 is in contact with the inner face of the flange 36, any intermediate position of the plate 32 with respect to its limit positions can be readily determined from the indicator 73. Hence, in bringing either or both of the sets of pressure cells into operation, the relative position of the plate 32 with respect to its limit positions may be observed to make sure that said plate is not against either of its stops.

In the form illustrated oil is led into the thrust bearing through pipes 75 and 76, delivering into chambers at the rear of the thrust receiving elements. The oil, after circulating through the thrust bearing chambers in a manner well understood in the art, is withdrawn from the thrust bearing housing through an outlet pipe 77. Said pipes 75, 76 and 77 pass through enlarged apertures in the bearing housing and are fixed to the cage 28, and have sufficient flexibility so as not to be injured by or to interfere with the movement of the cage 28 within the cylindrical bore of the bearing housing. The surfaces of engagement between the cage 28 and the bearing housing 29 are also lubricated so as not to resist unduly the desired axial movement of cage 28.

A lubricant should also be provided for the plungers of the pressure cells 47 and 48, and if desired, the cavities receiving the plungers of said cells may be filled with a lubricant. In any event, the lubricant used for the plungers 51 should be of such a character as not to injure the material of the diaphragms 49. Machine oil, such as would be conventionally used for lubricating the bearing members proper, would injure the diaphragms 49 when the latter are composed of rubber, and therefore it is important that any oil escaping from the thrust bearing housing should not reach the pressure cells. In view of the foregoing considerations and the desirability of keeping entirely separate the respective oils, particularly the machine oil used in the lubrication of the bearing and the special oil used in the lubrication of the plungers of the pressure cells, means are provided whereby oils escaping from their various places of use are kept entirely separate so that they may be used over again. As shown the interior of the ring 37 is grooved so as to provide three channels 78, 79 and 80. It will be seen from Fig. 1 that these three channels are so located that any oil seeping between the external surface of the cage 28 and the internal surface of the bearing housing 29 will be collected in the groove 78; any oil seeping from the chambers containing the bearing elements between the flange 33 and plate 32 will be collected in channel 79; and any oil escaping from the plunger chambers of the pressure cells 48 will be collected in the channel 80. Separate ducts 81 lead from the several channels 78, 79 and 80 so that the oil collected in each of these several channels is entirely segregated.

In operation, assuming that there is no pressure within the pressure cells of the thrust measuring device, thrust on the shaft 20 toward the right as viewed in Fig. 1 is transmitted through the shoes 24 and equalizing means 27 to the plate 32 which is moved against the flange 38, and the thrust load thereby sustained. If the thrust acts toward the left as viewed in Fig. 1 the thrust is transmitted by the shoes 25 and equalizing means 27 to the cage 30 which is thereby moved toward the left until its flange 33 is in contact with the flange 36, and thereby the thrust load is sustained. Therefore, the double acting thrust bearing continues to function precisely as if no thrust measuring device had been associated therewith.

Assuming that it is the thrust toward the right that is to be measured, pump 61 is operated to pump oil into the chambers 50 back of the diaphragms 49 of the set of pressure cells designated 48. The pressure transmitted to the diaphragms deflects the latter into uniform engagement with the plungers 51 and moves the corresponding plungers 51 toward the left as viewed in Fig. 1 until the said plungers pick up the plate 32 and move the same out of contact with the inner surface of the flange 38. The sliding fit between the cage 28 and housing 29 tends to maintain plate 32 at right angles to the axis of the bearing during this movement. By observation of the indicator 73 the oil volume applied to the cells 48 can be regulated so that the plate 32 is appropriately removed from its contact with the surface of flange 38 without being moved over into contact with the surface of flange 36. The thrust now being transmitted to the plate 32 is entirely sustained by the plungers and diaphragms of the respective pressure cells 48 and the fluid within their intercommunicating chambers 50, and the magnitude of this pressure is directly indicated on the dial of the corresponding gauge 68, so that the precise thrust being sustained can be determined from said gauge.

If the thrust in the opposite direction is to be measured pump 62 is actuated to bring the pressure cells 47 into operation. The plungers of the cells 47 now act upon the flange 43 of sleeve 42 and plate 32 attached thereto to move the plate 32 out of contact with the inner surface of the flange 36, and the thrust pressure transmitted to the plate 32 through shoes 25 and cage 30 is now sustained by the fluid in the pressure cells 47, whereby this pressure can be read on the dial of the corresponding gauge 68 to determine the thrust pressure.

In either event the thrust indicated at the corresponding gauge 68 is the net pressure corresponding with the externally applied load. When the shaft is not under load, oil films will be formed between the opposed faces of the collar and the corresponding shoes, the thickness of said films, and therefore the unit pressure therein, depending upon the setting of the blocks 34. If load is applied in either direction, the pressure in the oil films at one side of the thrust collar will be increased to sustain said load, and the pressure in the films at the opposite side of the collar will be decreased because of increased clearance, but as both sets of shoes are applying the pressure thereon to the cage 28, the pressure transmitted by the cage to the pressure cells is the net thrust acting on said cage, which in turn corresponds with the externally applied thrust load.

If the direction of the thrust reverses when one set of cells only is in operation, the plate 32 is merely moved by the new thrust until it is brought up against the inner surface of the cavity which contains said plate, and the load is thereafter sustained by the inner surface of said flange. However, it may be preferred to have both sets of cells in operation, so that a reversal of pressure will result in the thrust pressure being transmitted to the cells provided for determining the opposite direction of thrust. In this connection it is preferred that the opposite set of cells be brought into operation only after the end plate 32 has moved sufficiently to substantially remove the pressure from the first set of cells, i. e. that there be an intermediate position of plate 32 wherein the pressure will be indicated as zero on both indicators 68, but if desired, both sets of cells may be set up so as to be in continuous pressure engagement with end plate 32, in which event all variations in pressure on said plate 32 will be indicated on both gauges 68. In other words, the two sets of cells together will cooperate to indicate the net thrust pressure at the two gauges 68, notwithstanding reversals in the direction of the exterior load, the net thrust pressure at any time being represented by the difference in the pressures indicated at the two gauges 68 with adjustment for any difference in the effective areas of the cells acting in the opposite directions, if they are not of equal effective area.

Fig. 3 illustrates an embodiment of the present invention wherein the housing of the thrust bearing is so mounted that it may move in the direction of the axis of the shaft through a limited distance and the means for measuring the thrust are disposed exteriorly of the thrust housing in position to receive and sustain, as well as measure, the thrust transmitted by the shaft through the bearing elements to the thrust bearing housing. As here shown, the shaft 85 is provided with a bearing housing 86 of any suitable construction and containing a thrust bearing of any suitable character, construction and arrangement, whether single acting or double acting. As the details of the thrust bearing constitute no part of the present invention, they have not been illustrated. In order to provide for a limited axial movement of the thrust bearing housing said housing is disconnected from its bed plate or foundation 87 and supported therefrom at four points, two on each side adjacent the opposite ends of the bearing housing, by sections of I beams 88 suitably attached at their opposite ends to said foundation and said housing, as by bolts 89 passed through the upper and lower flanges of said I beam sections, whereby the opposite ends of each I beam section are anchored to the bearing housing and the foundation respectively. If desired the webs of said I beam sections may also be reenforced by angle plates 90 suitably bolted thereto.

It will therefore be perceived that by the foregoing mounting the bearing housing is supported at four symmetrically arranged points with respect to the axis of the shaft so that when thrust is applied to the bearing housing, it may move axially in one direction or the other, depending upon the direction of thrust, against the resistance provided by the elastic I beam sections which act as springs of limited flexibility. In order to prevent the introduction of complexities by reason of any lateral stresses acting on the bearing housing, said foundation 87 is preferably provided with ways of any suitable character such for example as conventionally used on machine tools, said ways extending parallelly to the axis of the shaft, and the bearing housing 86 is similarly provided with surfaces mating with said ways and extending parallel to the axis of the shaft, said surfaces coacting with said ways to the end that while said bearing housing may slide in the direction of its axis with respect to said ways, said bearing housing may not have any lateral or angular movement with respect to the foundation.

Means are provided for limiting the magnitude of the possible axial movement of the bearing housing and for preventing all movement of the bearing housing when the thrust measuring device is not in service. In the form shown the foundation 87 is provided with upstanding lugs or ribs 91 at each end thereof and interposed between each lug or rib 91 and the adjacent portion 92 of the base of the bearing housing at each of the four corners of the latter is an adjustable wedge 93 operable in the direction of its length in any suitable way as by a bolt or screw journaled in the foundation and which may be set up so as to resist all displacement of the bearing housing with respect to the foundation, but which may be released so as to provide a predetermined amount of movement of the bearing housing axially of the shaft in the desired direction. Thus, as shown in Fig. 3, the two wedges 93 at the right-hand end of the bearing housing as viewed in this figure have been relieved sufficiently to permit an axial displacement of the housing, say by an amount on the order of .020"—indicated by the clearance existing between the base of the bearing housing and the adjacent wedge 93 at the left-hand end of Fig. 3. In other words, the wedges have been properly positioned for the measurement of thrust toward the right as viewed in Fig. 3.

In the form shown in Fig. 3 provision has been made for measuring the thrust only toward the right, but it is to be expressly understood that if desired the means next to be described may be duplicated at the left end of the bearing as viewed in Fig. 3 so that the thrust may be measured in each direction. As here shown, the rib 91 on the foundation 87 at the right end of the bearing extends toward the axis of the shaft, as illustrated at 94, so as to provide a rigid abutment which also preferably extends transversely with respect to the axis of the shaft the full width of the bearing housing. Said abutment 94 thereby provides a recess 95 with the outer face of the bearing housing, and the bottom of this recess may be flat or curved to conform with the shape of the bearing housing. Installed within this recess 95 is a single cell 96 or a plurality of cells for measuring the thrust, said cell or cells preferably being of substantially the construction heretofore and hereinafter described in detail. The cell, when a single cell is used, may be of elongated or generally rectangular construction, extending substantially coextensively with the abutment 94 transversely of the bearing housing, or the pressure responsive device may be composed of a plurality of intercommunicating circular cells of the same general construction as illustrated in Figs. 1 and 8. Said cell, when one is employed, or each cell when a plurality are employed, is provided with a plunger 97 with which cooperates a lug 98 formed on or suitably attached to the bearing housing, so that when the bearing housing is free to move axially under the transmitted thrust, the thrust thereof is transmitted to the plunger or plungers 97 and thereby to the diaphragm or diaphragms of the cell or cells. It is to be understood that the cell or cells 96 are provided with suitable conduits, valves, etc., as well as a pump and a pressure gauge, so that a suitable fluid, such as castor oil, may be pumped into the cell or cells and the pressure sustained thereby be indicated on the gauge, these parts having been omitted from Fig. 3 for the sake of clearness.

In order to indicate the relationship of the bearing housing with respect to its foundation, an indicator 99 is suitably mounted on the foundation 87 and attached or otherwise suitably related to a lug 100 projecting from the bearing housing. The pointer of said indicator should be in neutral position when there is no thrust on the bearing and the stresses in the I-beam supports balance in an axial direction. Therefore, by reference to the position of the pointer of said indicator when the adjustable wedges are released the position of the housing with respect to the foundation can be readily determined. If preferred, the I-beam supports may be replaced by any other suitable mounting means permitting relative movement while maintaining proper relationship between the housing and its foundation.

In operation, when the thrust measuring device is not in service, the wedges 93 at both ends of the bearing will be set up so as to lock the bearing housing against displacement with respect to the foundation 87, with the indicator 99 showing that the housing is in neutral or mid position. If the thrust is to be measured, the adjustable wedges 93 at the right end of the bearing, as viewed in Fig. 3, are released a predetermined amount, and the thrust will then move the bearing housing axially of the foundation, and toward the right as viewed in Fig. 3, within the limit permitted by the adjustable wedges in their released position. This axial displacement of the bearing housing takes place against the elastic resistance of the four I-beam sections which connect the bearing housing to the foundation. The pump is now operated to fill the pressure cell or cells and thereby flex the diaphragm or diaphragms and move the plunger or plungers of the cell or cells into contact with the projection or projections on the bearing housing, until the pressure on the fluid in the cell or cells is sufficient, as shown by the indicator 99, to return the bearing housing to substantially its neutral or mid position. The entire thrust now acting on the bearing housing is being sustained by the fluid in the pressure cell or cells, and the magnitude of the thrust can be readily determined from the gauge connected to said cell or cells. It will be noted that when the embodiment of Fig. 3 is a double acting thrust bearing its operation is comparable to that of Figs. 1 and 2, the thrust bearing housing being comparable to the cage 28 of Figs. 1 and 2 in transmitting the net thrust pressure to the pressure cell or cells.

Fig. 4 illustrates an embodiment of the present invention whereby a single pressure cell may be employed in conjunction with a plunger within the bearing housing for measuring the thrust in one direction. Here again the bearing is indicated more or less diagrammatically as the details of the bearing constitute no part of the present invention. The thrust collar is indicated at 105 and cooperating therewith are thrust receiving members 106 of any suitable type and construction but here shown as composed of a series of shoes mounted on an equalizing device diagrammatically indicated at 107. In this embodiment the end of the bearing housing is closed by a frusto-conical end or spacing ring 108 provided with flanges 109 and 110. Flange 109 is suitably attached, as by bolts 111, to the end of the bearing housing, and flange 110 has attached thereto, as by bolts 112, the base ring 113 of a readily removable thrust measuring unit which takes the place of a cover which may be similarly mounted on said housing when said unit is not in place. Mounted within the ring 108 is a frusto-conical plunger 114 which may be made hollow to reduce its weight. Said plunger at its opposite ends has fitted cylindrical surfaces 115 and 116 for cooperation with surfaces on the ring 108, whereby said plunger 114 is permitted only rectilinear movements. The inner end of the plunger 114 projects slightly into the bearing housing proper where it has supporting relationship with the equalizing device 107. Plunger 114 and ring 108 also have cooperating radial surfaces 117 whereby, when these surfaces are in engagement, the thrust transmitted to the plunger 114 from the bearing elements is sustained by the ring 108 and the bearing housing to which it is attached. Plunger 114 and ring 108 are also provided with ribs 118 so as to form grooves which will prevent oil from the bearing housing from passing to the thrust measuring cell next to be described, and also for segregating any oil seeping from the thrust measuring cell from any oil escaping from the bearing housing. Separate ducts 119 lead from said grooves as heretofore described in detail.

The base ring 113 of the thrust measuring unit has a circular aperture 120 at its center, and mounted within said aperture is a plunger 121 which is designed to cooperate with the end 122 of the plunger 114. The outer face of flange 110 has a shallow recess 123 of a diameter somewhat larger than that of the plunger 121, while plunger 121 has a diameter somewhat larger than that of end 122 of plunger 114, so that plunger 121 if projected out of its recess 120 and toward the left as viewed in Fig. 4 will, after a predetermined movement fixed by the depth of the recess 123, come into contact with the bottom of said recess and thereby be prevented from moving plunger 122 toward the left by an amount which would unduly reduce the clearances within the bearing housing. Cooperating with plunger 121 is a diaphragm 124, preferably of rubber, held in position in any suitable way. As shown, said diaphragm is clamped to a radial surface 125 formed on the ring 113 by the radial surface of an annular rib 126 carried by a cover plate 127 suitably secured to the ring 113, as by bolts 128. The face of plate 127 is recessed at the rear of the diaphragm 124 as shown at 129 so as to provide a cell into which a suitable fluid, such as castor oil, can be pumped by a pump 130, preferably supported on the unit composed of ring 113 and plate 127. A gauge 131 is in communication with the cell 129, as by a suitable passage 132 in plate 127, so that the pressure transmitted to the fluid by plunger 121 will be indicated at the gauge 131. If preferred the construction of the pressure cell may be like that hereinafter described in conjunction with Fig. 8.

In order to determine the relative position of the radial surfaces 117 on the plunger 114 and ring 108, one or more connectors 133 are mounted to reciprocate in suitable apertures provided in the ring 108. The inner end of each connector 133 projects into engagement with the radial surface 117 on the plunger 114, and at its outer end said connector is attached to or suitably related with an indicator 134. Preferably two of said connectors and indicators are used, one on each side of the bearing housing.

In operation, and assuming that the thrust measuring device is not in service, the thrust on the shaft is transmitted by the collar 105 through the thrust elements 106 and equalizing device 107 to the plunger 114, and the thrust is sustained at the surfaces 117 between said ring 114 and the ring 108 attached to the bearing housing. Therefore the thrust bearing operates as if no thrust measuring device were associated therewith. If the thrust is to be measured the pump 130 is operated to pump oil into the chamber 129 of the cell, whereby the diaphragm 124 is flexed and plunger 121 moved toward the left as viewed in Fig. 4. When the pressure in the cell is sufficiently great the plunger 121 will move the plunger 114 toward the left as viewed in Fig. 4, until the surfaces 117 are out of contact. In this condition the plunger 114 is held to rectilinear movement by the fitted surfaces at 115 and 116; and kept in alinement with the plunger 121. The magnitude of the displacement of the surfaces 117 and the plunger 114 toward the left as viewed in Fig. 4 will be indicated on the dial of the indicator or indicators 134. If the pump should be operated to build up an undue displacement, so as to tend to move the plunger 114 so far toward the left as to unduly cut down the clearances within the bearing housing—which would in turn affect the magnitude of the thrust to be indicated—the plunger 121 will be arrested in its movement toward the left by coming into contact with the bottom of the recess 123. Hence, the pressure cell cannot be so operated as to unduly cut down the clearances within the bearing housing. When the pressure cell has been operated so as to move the plunger 114 to the left sufficiently to move the surfaces 117 out of contact, the entire thrust is then transmitted from the thrust receiving elements through the plunger 114 to the plunger 121, and through the diaphragm 124 which lies flat across the entire face of said plunger 121 to the contained fluid of the thrust measuring cell, whereby the magnitude of the pressure can be at once accurately determined from the diameter of the plunger 121 and the unit pressure at the gauge 131. The pressure so indicated is the absolute pressure toward the right in Fig. 4, and if there is pressure in the oil films on the unloaded side of the bearing, a suitable correction must be made therefor.

Figs. 5 and 6 illustrate an embodiment of the invention which employs a plunger in place of a diaphragm in the pressure cell, a construction which if preferred can be used in other embodiments of the invention. It is to be expressly understood, however, that a pressure cell of the diaphragm type can be substituted for the plunger construction now to be described. In this embodiment each individual shoe of the bearing is provided with its own thrust measuring device, and the several cells are intercommunicating so that the pressure on the several shoes is interequalized while the thrust measuring device is in operation. Fig. 5 shows the invention as applied to a two-shoe bearing, but it will be apparent that this embodiment of pressure cell can be used with a single shoe or with any other number of shoes as preferred.

Each bearing shoe is provided with a thrust pin 140 in a manner well understood in the art for transmitting the thrust pressure on the shoe. At the outer end of the thrust pin the bearing housing is provided with a threaded recess 141 within which is received the threaded nipple 142 of a cylinder 143 that is closed by a suitable end plug 144. Mounted within the recess of said cylinder 143 is a plunger 145 from which a thrust pin 146 extends into engagement with the end of the thrust pin 140. The inner face of the plug 144 is shown as provided with a boss or projection 147 which engages the end of the plunger 145 when the thrust measuring device is not in operation. At this time the thrust of the shoe is transmitted through the thrust pin 140 to the thrust pin 146, and by the latter to the plunger 145 and thence to the closure plug 144. The clearance of the shoe with respect to its cooperating bearing member is thus determined by the position of the cylinder 143 with its contained boss 147, and washers 143' of proper thickness may be interposed between the cylinders and adjacent faces of the bearing housing to predetermine the position of said cylinders with their contained bosses 147. Therefore the shoes are readily adjustable from the outside of the bearing housing, even when the bearing is in operation, and the cylinders can be backed out to a suitable amount when the thrust measuring device is to be used, and subsequently returned to reposition the bosses 147 at their initial predetermined position, as desired without interfering with the operation of the bearing.

When it is desired to measure the thrust, a suitable fluid such as oil, is pumped into the cylinder 143, into the chamber between the plug 144 and the plunger 145. The pump is schematically indicated at 148, and it communicates with each of the cylinders 143 through pipes 149 which have intercommunication within the casing 150. A pipe 151 also extends from said casing to a gauge 152. When oil is pumped into the cylinders 143, the thrust transmitted to the plungers from the shoes is now sustained by the oil in the cylinders. The thrust so exerted on the oil is not only interequalized by means of the intercommunicating pipes, but the magnitude of the pressure is shown at the gauge 152. When used with a double acting thrust bearing, this pressure must be corrected by that existing on the opposite or unloaded side of the thrust collar. If like cells are used for the shoes on the opposite side of the thrust collar, the net pressure is shown by the difference in reading of the gauges at the two sides.

In the embodiment shown in Fig. 7 a thrust measuring cell is illustrated for use in conjunction with an adjustable jackscrew as commonly used in some forms of thrust bearings. As in the embodiment of Figs. 5 and 6 there is a thrust measuring cell individual to each shoe, and the invention can be employed with one or any suitable number of shoes. When a cell is used with each of a plurality of shoes the several cells preferably have intercommunication so that they act as a pressure equalizing device as well as a means for measuring the thrust. This embodiment of the invention as well as that of Figs. 5 and 6 can also be used to measure the thrust on one of several shoes where equalizing means are employed using the principle disclosed in my Patent No. 1,361,073, so that it is known that each shoe sustains a definite fraction of the entire thrust load. By mounting one of the equalizing blocks of such equalizing means on the thrust pin extending to a single cell of one of these embodiments, a definite fraction of the thrust load is indicated at the gauge in communication with said cell.

Fig. 7 shows a thrust pin 149 for transmitting the pressure from the shoe to a jackscrew of conventional construction. In conformity with the present invention the conventional jackscrew is replaced by a combined jackscrew and pressure indicating cell. The shank 151 of the device is suitably threaded for entry into the threaded recess 150, and said shank is also bored at its center to receive a thrust pin 152 which lies wholly within the tubular bore of the shank 151 when the thrust measuring cell is not in operation, but which can be projected from said tubular shank to engage and sustain the thrust transmitted by the pin 149 as hereinafter explained. The head 153 of the combined jackscrew and pressure measuring cell is provided with a recess 154 in which is disposed a plunger 155 that has operative engagement with the thrust pin 152 and which is restrained in its movement by engagement with the surface 156. At its outer face said plunger 155 is in contact with a suitable diaphragm 157, shown as clamped in position by a cover plate 158 suitably held on the head 153 as by screws 159. The inner face of the head 158 is recessed at 160 to provide a pressure cell at the forward side of the diaphragm 157, and said head 158 is also provided with suitable passages 161 leading to a pump and gauge not shown. To indicate the position of the thrust pin 152 with respect to thrust pin 149 either the thrust pin 152, when the head 153 is sufficiently removed from the adjacent wall of the bearing housing, or the plunger 154 may be provided with a radial pin 162 which projects outwardly through an enlarged opening in the shank or head, as the case may be, of the combined jackscrew and pressure measuring cell, where it is connected to or suitably associated with the stem 163 of an indicating device 164.

When the pressure cell is not in operation the thrust on the shoe is transmitted by the thrust pin 149 to the end of the shank 151 of the combined jackscrew and pressure measuring cell, and the shoe can be readily adjusted from the exterior of the bearing housing, by rotating the jackscrew, even when the bearing is in operation. At this time the thrust pin 152 lies wholly within the bore of the shank 151 and is not transmitting any pressure to the pressure cell. When the thrust is to be measured, oil is pumped through the passages 161' into cell 160, thereby flexing the diaphragm and moving the plunger 155 toward the left as viewed in Fig. 7. The thrust pin 152 is therefore moved to the left sufficiently to remove the end of the thrust pin 149 from the end of the shank 151. All of the thrust is now transmitted by the thrust pin 149 to the thrust pin 152, and thence to the plunger 155 and diaphragm 157. Hence the entire thrust is being sustained by the oil in the cell, and the magnitude of the thrust can be determined from the gauge.

When several cells, one for each shoe, are employed they are preferably in intercommunication, and therefore the cells also act as a hydrostatic equalizer of the pressure, while the magnitude of the pressure shown on the gauge is a measure of the total thrust transmitted. The position of the thrust pin 152 with respect to the thrust pin 149 is shown on indicator 164, because said indicator is operated by the radial pin 162 as the plunger 155 moves relatively to the shank 151 to receive the pressure or to permit the pressure to be sustained entirely by the end of the shank 151. It is to be understood that the cell in its details may be the same as herein described in conjunction with other embodiments of the invention.

Fig. 8 illustrates in enlarged section the preferred construction of thrust measuring or pressure cell to be employed. It is to be understood that a cell of the construction now to be described in detail may be employed in any suitable thrust measuring device embodying the present invention, whether using one or a plurality of cells. The base ring 166 of the removable thrust measuring unit is shown as provided at its opposite faces with cells for receiving and measuring both the forward and rearward thrusts, but it is to be understood that the unit may be provided with only one set of cells if the thrust is to be measured in one direction only. Also, it is to be understood that if a single cell is to be used as in some embodiments the same construction may be employed as now to be described.

A clamping ring 167, provided with a cylindrical chamber 168, is suitably secured, as by bolts or screws, to a face of said base ring. Within said chamber 168 is a plunger 169, shown as provided with a block 170 having a spherically faced projection 171 to provide a point contact with a wear block 172. Said plunger has a close sliding fit in said ring 167 and is in face contact with a diaphragm 173 of any suitable material but preferably made of rubber, which diaphragm constitutes a joint seal at the coacting surfaces of plunger 169 and ring 167 and also forms one wall of a shallow chamber 174 for receiving the pressure transmitting fluid, preferably castor oil. Said rubber diaphragm 173 is clamped by an annular plane surface 175 on ring 167 against an annular plane surface 176 on base ring 166, and ring 167 is set up so as to compress the rubber, say on the order of 25% of its thickness, between the plane annular surfaces 175 and 176, sufficiently to form a fluid-tight joint. In order to maintain the plunger 169 in alinement in its chamber 168 and yet permit some misalignment to compensate for deflections arising in the structure, the end of the plunger adjacent the diaphragm is provided with a short cylindrical surface 178 which forms a sliding fit within the wall of the cylindrical chamber 168, and adjacent its opposite end said plunger is provided with a groove 180 which contains an elastic ring, preferably a ring of rubber 181 which is shown as rectangular in cross section and which is under a moderate initial compression. Intermediate said surface 178 and said ring 181 the plunger is of smaller diameter than said chamber 168 so as to be out of contact therewith. Said bearing surfaces at 178 and said gasket are suitably lubricated as by the use of castor oil.

With the construction of cell described the pressure transmitting fluid cannot escape around the periphery of the diaphragm 173, because not only is the periphery of the diaphragm held under compression between the surfaces 175 and 176 but the pressure of the fluid on the material at this joint forces the diaphragm material into the joint between the metal faces, increasing the pressure therein in proportion to the increase in pressure in the cell. As shown, rings 166 and 167 have fitted engaging surfaces at 182, but if the surfaces 175 and 176 are of sufficient radial extent the fitting of the surfaces at 182 is unnecessary as the diaphragm material will not be forced out therebetween. The joint seal at the annular surfaces of contact between plunger 169 and ring 167 prevent leakage of the pressure fluid and yet is not forced between said elements owing to their close fit. The plunger diameter can be accurately measured and used as the effective diameter of the pressure surface, because the elastic rubber is forced against the entire rear face of the plunger and, as the face of the plunger has only a slight movement in transmitting the pressure to the pressure indicating instrument and therefore ordinarily lies substantially in the normal plane of the diaphragm or joint seal, the pressure indicated is a correct measure of the thrust as determined by the area of the plunger and the gauge pressure without other calibration. Moreover, although preferably the face of the plunger will be substantially in the normal plane of the diaphragm, no allowance has to be made for the annular zone of flexure from the supporting surfaces 175, 176 to the contact with the plunger if the face of the plunger is somewhat outside of the normal plane of the diaphragm, as would have to be done if metal were used as the diaphragm material. The plunger is normally caused to move rectilinearly by reason of the sliding fit at its inner end and the elastic guide ring at its outer end. The pressure within the cell acting on the diaphragm tends to exert a uniform pressure over the entire face of the plunger, but if, due to distortion or deflection, there is any tendency of the plunger to move angularly with respect to its axis, notwithstanding the sliding cylindrical fit at its inner end, this movement is permitted by the elastic ring 181. Thereby metal to metal contact is prevented at the outer end of the plunger. At the same time, said ring permits axial movement of the plunger without undue restraint, reducing frictional resistance to a minimum, so that the plunger may move rectilinearly without substantial diminution in the indicated pressure. Also, as the plunger has a point contact at 170, 171, lateral deflections may occur and the plunger become slightly misalined without causing any binding of the parts that will upset the accuracy of the indication of thrust pressure.

The development and control as well as the measurement of the pressure in the cell or cells as heretofore described can be effected by any suitable means, and while they may be supported at any suitable point more or less adjacent to the bearing but independently thereof, it is preferred to support the pump or pumps, together with the necessary valves, pipes, gauges, etc., in unitary relationship with the base ring for the cells.

Referring first to Fig. 4 wherein a single cell unit is illustrated, a simple and convenient type of pump is somewhat diagrammatically illustrated as composed of a pump plunger 185 which is operated by a lever 186 to withdraw a suitable fluid, such as castor oil, from the reservoir 187, and draw it through a suitable pipe 188, past check valve 189 and force the same through passage 190 into the cell chamber 129. In order to provide means for retaining the oil under pressure within the cell, a check valve may be provided at 193, in which event a second passage and manually controlled valve (not shown) would be provided for returning the oil from the cell to the reservoir 187 when the cell is to be rendered inoperative. A manually operated valve 191 is also preferably provided in the passage 190 to the end that the pressure may be retained in the cell if the check valve at 193 should leak. As heretofore explained, the cell cavity 129 communicates through a duct 132 with any suitable pressure gauge, as a Bourdon tube gauge, and to dampen out undesired fluctuations at the gauge which may arise from vibrations in the bearing structure or fluctuations in the thrust, a throttling valve 192 is preferably provided in the passage leading to the gauge 131 so that said passage may be constricted to the extent desired for dampening the fluctuations of pressure that might otherwise make difficult the reading of the gauge 131.

The preferred construction of pump, valves, piping, etc., is illustrated in Figs. 1 and 2, some of the details being shown in greater detail in Figs. 9, 10 and 11. As here illustrated the unit is composed of cells for separately indicating the forward and rearward thrust pressures, although both sets of cells might be in communication with a single pump or a single gauge or both if suitable valves are provided for rendering one or the other of the sets of cells operative. It is also to be understood that if the thrust is to be indicated in only one direction, the apparatus will include only one pump, one gauge, and the cooperating conduits, valves, etc. As the pumps, valves, gauges, conduits, etc., for the two sets of cells are duplicates, it will be sufficient to describe one of them in detail.

As shown in Figs. 1, 2, 9, 10 and 11 the pump and manifold housing, generally designated 60 in Fig. 2, includes a reservoir 195 for the pressure fluid, such as castor oil, and suitable passages 196 and 197 leading to the inlet valve 198, here shown as in the form of a ball valve backed by a coil spring 199, so that it will close quickly. From the intake valve 198 a passage 200 leads to a check valve 201, here shown as also in the form of a ball valve backed by a coil spring 202. From the check valve 201 a conduit 64 leads to the corresponding valve housing 65 (or 66) heretofore referred to. The plunger 203 of the pump is manually operable by a lever 204. Any leakage past the plunger 203 is collected at the top thereof in the space 204' and returned to the reservoir through the passages 205. The housing also contains a by-pass 206 leading from the outlet side of the check valve 201 so that the oil may be returned to the reservoir when the pressure in the cells is to be released. A manually operated valve 207 having a hand wheel 208 is provided for releasing the pressure in the cells and permitting the return of the oil through by-pass 206 to reservoir 195.

The valve at 65 (or 66) subserves the function of retaining the pressure within the cell or cells and gauge independently of the pump, so that when the pump has been operated to develop the desired pressure in the particular cell or cells, the corresponding valve may be closed to retain the oil under pressure within the system of cells and gauge. Referring to Fig. 11, pipe 64 leads into the valve block 215 at 209. The pipe 67 leading to the gauge 68 leads from the valve block 215 at 209'. A third duct 210 leads downwardly within the block 215 for communication with one of the passages 56 or 57 in the base plate of the unit heretofore described. A valve member 211, having a hand wheel 212 is rotatably mounted in the bonnet 213, and when moved against its seat 214 closes off communication between the inlet 209 and the outlets 209' and 210. Thus when said valve 211 is closed the gauge outlet 209' is still in communication with the outlet 210 leading to the pressure cells, so that said cells and gauge are always in open communication. As shown in Fig. 1 a dampening valve 214' is provided between the pipe 67 and the indicator 68 to subserve the same functions as heretofore described with regard to valve 192 in Fig. 4.

Another arrangement whereby the net thrust pressure on either or both sides of a double acting thrust bearing may be indicated is shown in Figs. 12 and 13. The general construction illustrated in these figures is shown and described in my prior application Serial No. 585,346, filed January 7, 1932, of which the present application is a continuation in part. Briefly, the bearing structure here illustrated comprises a pair of diametrically disposed bearing shoes 215 and 216 at each side of the thrust collar 217. The shoes at both sides of the thrust collar are supported by a U-shaped yoke 218 which has radially directed U-shaped flanges 219 at each side of the collar and upon which the bearing shoes are supported in any suitable way. Said yoke is mounted for universal movement by supporting the same on a lug 230, which may be spherically faced, projecting from the bottom wall of the housing and lying in the vertical plane through the axis of the shaft, said yoke being also engaged on opposite sides, through the medium of spherically faced inserts 231, by adjustable pins 232 which also lie in the vertical plane through the axis of the shaft. Centering lugs 233 prevent radial displacement of the yoke. Pressure on the bearing shoes 215 or 216 at the active side of the collar 217 is thus equalized by the capacity of the yoke to move about a vertical axis determined by the active pivot pin 232, while said yoke may also move about a horizontal axis determined by said pivot pin in proportion to the amount of the net thrust on said bearing. Bridging the top portions of said yoke is a member 220 having an upstanding rigid arm 221 which is apertured at 222. Extending through said aperture 222 is a rod 223 to which the arm 221 is suitably affixed, as by lock nuts 224. Rod 223 extends on either side of arm 221 and projects into the interior of two pressure cells 225 and 226, which may be supplied with a suitable liquid through pipes 227. Each of the cells 225 and 226 may be of any suitable construction, but by preference it will be of substantially the construction heretofore described in detail, particularly with reference to Fig. 8, it being understood that the inner ends of the rod 223 will be associated, in suitable pressure transmitting relationship, with the outer faces of the plungers of the pressure cells heretofore described. Each of said pressure cells is preferably provided with its own indicator 229 with which it communicates through pipe 228, so that the net thrust can be separately indicated for either direction, but this is not essential. The yoke 218 can be compared with the cage 28 of Fig. 1, said yoke transmitting the net thrust pressure at any instant, so that the net thrust can be determined from the proper gauge 229, depending on the direction of the thrust, or both cells can be put in operation so that any reversal of thrust can be measured.

In such embodiments as shown in Figs. 1, 2 and 12, 13 either set of cells may be placed in operation to show the net thrust for the proper direction, or both sets of cells may be conditioned for simultaneous operation to show reversals of thrust. In this event both sets of cells will preferably be so set up as to show zero net thrust at the same time but to show any departure from zero net thrust on one or the other of the gauges. The latter result can also be obtained with such embodiments as shown in Figs. 5, 6 and 7 by providing the thrust elements on opposite sides of the thrust collars with the devices shown and taking the difference of the gauge readings.

It will therefore be perceived that the present invention provides a thrust measuring device that can be employed at will to measure the thrust and which will not interfere with the normal and proper operation of the thrust bearing either when it is in service or when it is rendered inoperative. Moreover, the thrust measuring device of the present invention can be readily formed into a unit which can be easily installed on or removed from thrust bearings already in service as well as readily applied to new bearings. While each embodiment shown has taken the form of a readily removable unit, however, it is to be understood that if preferred the cells disclosed can be built into the bearing structure. It is also to be expressly understood that when necessary or desirable the readily removable unit may be made in sections to embrace the shaft or elements thereon.

The thrust measuring device of the present invention is also capable of ready standardization, and can be applied to a wide variety of thrust bearings using thrust receiving elements, with or without equalizing devices, of a wide variety of constructions. It can also be used with equal facility for bearings employing different numbers of thrust receiving elements. Moreover, the present invention can be embodied in units employing a single pressure cell or in units employing a plurality of pressure cells, and when the latter are used the pressure on the bearing elements can be interequalized by the pressure fluid used in the operation of the thrust measuring devices.

The present invention can also be used in conjunction with either internal or external plungers moved in response to the thrust existing on the shaft, or it can be used in conjunction with a movable thrust housing, or it can be used in place of an individual thrust receiving element such as a jackscrew. Moreover, when a bearing is provided with equalizing means of the type illustrated in Figs. 1 and 2, for example, where there are a plurality of elements each sustaining its proper fractional part of the entire load existing on the shaft, a thrust measuring device such as illustrated in Fig. 7 for example can be associated with any one of said elements to determine the fractional part of the thrust sustained by that element, and upon this indication can be accurately determined the entire thrust sustained by the shaft. Additionally, it will be observed that the present invention enables the thrust to be measured independently in each of the two directions of thrust existing in a double acting thrust bearing as well as for indicating the magnitude of the thrust in a single direction in a single acting thrust bearing, and in the case of a double acting thrust bearing the opposed thrusts can be measured either separately or conjointly so as to show the net thrust. The present invention also provides a pressure cell which is fluid tight, and which has a substantially uniform and relatively small resistance to movement in response to the thrust pressure. Improved means for developing, controlling and measuring the pressure have also been provided.

It will also be seen that means have been provided whereby different oils escaping from different parts of the structure are separately collected and segregated, while machine oil is kept away from each diaphragm of the pressure cells so that rubber may be safely used without danger of injury thereto from machine oil coming in contact therewith. Means have also been provided whereby the pressure responsive elements of the bearing are restrained as to their movements so that they cannot move to an undue amount, and in the event the pressure measuring device fails to sustain the load, said elements cannot move so far as to cause injury to or interference with the proper operation of the bearing. Moreover, means have been provided whereby the position of said relatively movable parts can be accurately determined to the end that said parts may be properly positioned for the most efficient and accurate transmission of thrust pressure to the pressure cells when the thrust is to be measured.

Furthermore, it will be perceived that there has been provided a thrust measuring device which may be composed of a single or a plurality of cells and which in either event is relatively strong and rugged and certain in operation, although simple in construction. The thrust measuring cell can be used individually with each of a plurality of thrust receiving elements, or it may be used in conjunction with one of several thrust receiving elements where each is known to sustain a definite fraction of the entire thrust. Also, as in the embodiment of Fig. 7, a single cell may be used in place of a jackscrew or other means for supporting or adjusting the load on a single thrust receiving element, or if desired a plurality of such elements may be interconnected to safely sustain and interequalize the load on a plurality of thrust receiving elements, while these elements are readily accessible outside of the bearing housing for adjustment.

From the foregoing it will be apparent that the invention is capable of receiving a wide variety of mechanical expressions. While those illustrated on the drawings have been described with considerable particularity, it is to be expressly understood that the invention is not restricted thereto, as various other embodiments will now suggest themselves to those skilled in the art. Certain of the features may be used without other features, features shown in conjunction with one embodiment may be used in place of or in conjunction with features shown in other embodiments, certain features may be omitted, and changes may be made in the details of construction, arrangement and proportion of parts without departing from the spirit of this invention. While it is preferred to use a pressure cell of the diaphragm type heretofore disclosed, it is within the contemplation of the invention in its broader aspects to use other means for receiving and indicating pressure, such for example as the plunger of Fig. 6. While rubber is preferred as the diaphragm material, other suitable materials may be used, and other forms of cells, plungers, pumps, valves, gauges, etc., as well as other means for transmitting pressure to the cells, may be employed without departing from the present invention. Reference is therefore to be had to the appended claims for a definition of said invention.

What is claimed is:

1. A thrust measuring device for thrust bearings including a self-contained, readily attachable and detachable unit adapted to be applied as a one piece structure to a thrust bearing housing, said unit including a base member, a plurality of fluid operated cells mounted thereon at opposite faces of said base member, and means associated with each cell adapted to be projected by fluid pressure into thrust receiving relationship with an element of the thrust bearing and without interfering with the normal operation of said element, said element transmitting the thrust pressure to said cells for measurement of the thrust by the fluid pressure therein.

2. A thrust measuring device for thrust bearings including a self-contained, readily attachable and detachable unit adapted to be applied to a thrust bearing housing and including a one-piece base member, one or more fluid operated cells thereon having means adapted to be projected into thrust receiving relationship with an element of the thrust bearing, and a completely self-contained system incorporated in said unit and mounted on said base member to be attached to and detached from said bearing therewith for storing the required fluid and developing and indicating pressure in said cell or cells.

3. A thrust measuring device for thrust bearings including a self-contained, readily attachable and detachable unit adapted to be applied to a thrust bearing housing and including a base member, oppositely facing fluid operated cells thereon having means adapted to be projected into thrust receiving relationship with an element of the thrust bearing, and a completely self-contained system incorporated in said unit and mounted on said base member to be attached to and detached from said bearing therewith for developing and indicating pressure in the fluid of said cells.

4. A thrust measuring device for thrust bearings including a self-contained, readily attachable and detachable unit adapted to be applied to a thrust bearing housing and including a base member adapted to be secured to said housing, oppositely facing fluid operated cells thereon having means adapted to be projected into thrust receiving relationship with an element of the thrust bearing, said unit also including as parts thereof a pump on said base member for developing fluid pressure in said cells, a source of fluid communicating with said pump, means for indicating the pressure in said cells, and means for retaining the pressure in said cells independently of said pump, providing a self-contained system mountable on and demountable from said housing as a part of said unit.

5. A thrust measuring device for thrust bearings including a self-contained, readily attachable and detachable unit adapted to be applied to a thrust bearing housing and including a base member adapted to be secured to said housing, oppositely facing fluid operated cells thereon having means adapted to be projected into thrust receiving relationship with an element of the thrust bearing, said unit also including as parts thereof a pressure gauge on said base member in communication with said cells, a pump and fluid supply for developing fluid pressure in said cells, and means for dampening the fluctuations of pressure transmitted to said gauge, providing a self-contained system mountable on and demountable from said housing as a part of said unit.

6. A thrust measuring device for thrust bearings including a self-contained, readily attachable and detachable unit adapted to be applied to a thrust bearing housing and including a base member adapted to be secured to said housing, oppositely facing fluid operated cells thereon having means adapted to be projected into thrust receiving relationship with an element of the thrust bearing, said unit also including as parts thereof a pump for developing fluid pressure in said cells, a reservoir for said fluid, a pressure gauge in communication with said cells, and conduits between said cells and said pump and gauge, providing a self-contained system mountable on and demountable from said housing as a part of said unit.

7. In a thrust measuring device for thrust bearings, a readily attachable and detachable thrust measuring unit including a member adapted to be mounted on a thrust bearing housing, a pressure cell carried by said member for axial alinement with a thrust transmitting element, said element having an axially extending portion cooperating with said bearing housing to maintain axial movement thereof, and means associated with said cell adapted to be projected by fluid pressure into thrust receiving relationship with said element of the thrust bearing.

8. In a thrust measuring device for thrust bearings, a self-contained, readily attachable and detachable thrust measuring unit including a single base member adapted to be secured to one end of the bearing housing, a fluid pressure means carried thereby and provided with means adapted to be projected into thrust receiving relationship with an element of the thrust bearing, a pump supported on said base member for developing pressure in said fluid pressure means, a reservoir supported on said base member for supplying fluid to said fluid pressure means, and a gauge on said base member for measuring the pressure existing in said fluid pressure means.

9. In a thrust measuring device for double acting thrust bearings, in combination with a member for transmitting the net thrust of the oppositely acting relatively stationary bearing members, a readily attachable and detachable thrust measuring unit adapted to be mounted on the thrust bearing housing and including pressure cells having means adapted to be projected in opposite directions into thrust receiving relationship with said member for opposite directions of thrust and adapted to measure the net thrust on the bearing.

10. In a thrust measuring device for double acting thrust bearings, in combination with a member for transmitting the net thrust of the oppositely acting relatively stationary bearing members, a readily attachable and detachable thrust measuring unit adapted to be mounted on a thrust bearing housing and including oppositely acting pressure cells having means adapted to be projected into thrust receiving relationship with said member and adapted to measure the net thrust in either direction.

11. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions.

12. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions, and means carried by said unit for selectively developing pressure in either of said two sets of cells.

13. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions, and means carried by said unit for selectively measuring the pressure existing in said cells.

14. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions, and a pump for each of said sets of cells carried by said unit.

15. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions, and a gauge for each of said sets of cells carried by said unit.

16. In a thrust measuring device for thrust bearings, a readily attachable and detachable thrust measuring unit including a single base member, a plurality of pressure cells carried by said base member and arranged in two sets of oppositely facing cells, said cells having means adapted to be projected into thrust receiving relationship with an element of said thrust bearing and the cells of the two sets being respectively adapted to take the thrust in opposite directions, and independent systems carried by said unit for developing and measuring the thrust in each of said sets of cells, said pressure developing and measuring systems being either independently or simultaneously operable.

17. In a thrust measuring device for thrust bearings, a thrust measuring unit comprising a diaphragm, a chamber closed by said diaphragm and adapted to be filled with a fluid under pressure, and a plunger associated with said diaphragm and adapted to transmit thrust pressure uniformly over the free area of said diaphragm associated with said plunger, said plunger being provided adjacent said diaphragm with an axially extended peripheral bearing surface and adjacent its opposite end with an elastic ring for guiding the same in its rectilinear movements.

18. In a thrust measuring device for thrust bearings, a thrust measuring unit comprising a diaphragm, a chamber closed by said diaphragm and adapted to be filled with a fluid under pressure, a plunger associated with said diaphragm and adapted to transmit thrust pressure thereto, means providing a chamber in which said plunger is mounted for rectilinear movement and having an axially extended peripheral contact with said plunger adjacent the diaphragm end thereof, and means for guiding the opposite end of said plunger while permitting slight movement thereof laterally with respect to its axis.

19. In a thrust measuring device for thrust bearings, a thrust measuring unit comprising a rubber diaphragm, a chamber closed by said diaphragm and adapted to be filled with a fluid under pressure, a plunger associated with said diaphragm and adapted to transmit thrust pressure thereto, means providing a chamber in which said plunger is mounted and having an axially extended peripheral contact with said plunger adjacent the diaphragm end thereof, and a compressed elastic ring for guiding the movements of said plunger.

20. In a thrust measuring device for thrust bearings, a thrust measuring unit comprising a threaded hollow shank having a head thereon and adapted to operate as a jackscrew, a plunger mounted to reciprocate in said shank, and a pressure cell mounted in said head and cooperating with said plunger.

21. In a thrust measuring device for thrust bearings, a thrust measuring unit comprising a threaded hollow shank having a head thereon and adapted to operate as a jackscrew, a plunger mounted to reciprocate in said shank, a pressure cell mounted in said head, said cell including a diaphragm and a chamber closed by said diaphragm and adapted to contain fluid under pressure, and a second plunger cooperating with said first named plunger and adapted to distribute the pressure thereon over substantially the entire free face of said diaphragm.

22. In a thrust measuring device for thrust bearings, a thrust measuring unit comprising a threaded hollow shank and a head thereon and adapted to operate as a jackscrew, a plunger reciprocably mounted in said shank, a pressure cell mounted in said head and cooperating with said plunger, a radially projecting arm in said unit adapted to be moved proportionately to the movement of said plunger, and an indicator associated with said radially projecting arm and adapted to indicate the position of said plunger.

23. In a thrust measuring device for a thrust bearing having thrust receiving elements, a housing for said elements, a member adapted to receive thrust from said elements and means carried by said housing cooperating with said member and adapted to sustain the thrust transmitted by said member, and a single fluid pressure means disposed in alignment with the axis of said member and attached to said housing and adapted to move said member off of said sustaining means, said fluid pressure means having means in communication therewith for developing and measuring pressure within said fluid pressure means.

24. In a thrust measuring device for a thrust bearing having thrust receiving elements, a housing for said elements, a member adapted to receive thrust from said elements and means carried by said housing cooperating with said member and adapted to sustain the thrust on said bearing, one or more pressure cells attached to said housing and adapted to move said member off of said last named means, said pressure cell or cells having means in communication therewith for developing and measuring pressure therein, and means associated with said cell or cells for collecting and removing oil escaping from said thrust bearing to prevent the same reaching said cell or cells.

25. In a thrust measuring device for a thrust bearing having thrust receiving elements, a housing for said elements, a member adapted to receive thrust from said elements and means carried by said housing cooperating with said member and adapted to sustain the thrust on said bearing, one or more pressure cells attached to said housing and adapted to move said member off of said last named means, said pressure cell or cells having means in communication therewith for developing and measuring pressure therein, and means cooperating with said bearing and said cell or cells for separately collecting and segregating any lubricant escaping from said bearing from any liquid escaping from said cell or cells.

26. In a thrust bearing, in combination with relatively rotatable thrust receiving elements, means adapted to be associated individually with one of said thrust receiving elements and to measure the thrust exerted thereon, said means including a member adapted to sustain the thrust on said thrust receiving element, a plunger carried by said member and adapted to project therefrom to remove the thrust from said first named member and to itself receive the thrust on said thrust receiving element, a pressure cell cooperating with said plunger to sustain the thrust thereon and constituting a unit therewith, and means for developing and indicating pressure in said cell.

27. In a thrust bearing, in combination with relatively rotatable thrust bearing elements including a plurality of shoes, a thrust measuring unit adapted to be associated with a single shoe and including a member adapted to sustain the thrust on said shoe, a plunger carried by said member and adapted to project beyond said member to itself receive the thrust on said shoe, a pressure cell carried by said member in unitary relationship therewith and operatively related to said plunger, and means for developing and indicating pressure in said cell.

28. In a thrust measuring device for a thrust bearing having a housing and relatively rotatable thrust bearing elements therein adapted to sustain the thrust in opposite directions, a unitary structure movable in said housing for receiving and normally transmitting to said housing the thrust exerted on said thrust bearing elements in both directions, oppositely acting pressure cells associated with one end of said last named structure and adapted to be actuated by the movement of said structure, and means for developing and indicating pressure in said cells to measure the thrust in opposite directions.

29. In a thrust measuring device for a thrust bearing having a housing and relatively rotatable thrust bearing elements adapted to sustain the thrust in opposite directions, a single unitary structure associated with said thrust bearing elements in said housing and adapted to be moved in one direction or the other by the thrust on said elements, pressure cells at one end of and operated by said structure as it moves in one direction or the other, and means for developing and indicating pressure in said cells.

30. In a thrust measuring device for a thrust bearing having a housing and relatively rotatable thrust bearing elements adapted to sustain the thrust in opposite directions, a single unitary structure mounted in said housing and associated with said thrust bearing elements and adapted to be moved in one direction or the other by the thrust on said elements, separate pressure cells mounted as a unit and operated by said structure as it moves in one direction or the other, and means for developing pressure in said cells and indicating the pressure existing therein in each direction.

31. In a thrust bearing, in combination with relatively rotatable bearing members including a plurality of thrust receiving elements, a pressure cell external of the bearing housing associated with each of said thrust receiving elements and adapted to receive the thrust exerted thereon, and common means for developing and measuring pressure in said cells, said cells being in communication whereby the pressure on said elements is interequalized.

32. In a thrust bearing, in combination with a housing, relatively rotatable thrust bearing elements therein including a plurality of bearing shoes, an adjustable pressure cell associated individually with each shoe exteriorly of said housing and adapted to sustain the pressure exerted on said shoe, means communicating with all of said cells for developing pressure therein, and means in communication with all of said cells for indicating the pressure existing therein.

33. In a double acting thrust measuring device for a thrust bearing having relatively rotatable thrust bearing elements, a housing for said elements, and a rectilinearly movable member adapted to seat on said housing and sustain the thrust on said elements, means for measuring the thrust on said elements including a one-piece base plate adapted to be secured to said housing contiguous to said member, oppositely acting pressure responsive means mounted on said base plate and adapted to be operated to remove said member from its seat on said housing, said base plate and pressure responsive means comprising a self-contained, readily attachable and detachable unit, and means for developing and indicating pressure in said pressure responsive means.

34. In a double acting thrust measuring device for a thrust bearing having relatively rotatable thrust bearing elements, a housing for said elements and a rectilinearly movable member adapted to seat on said housing and sustain the thrust on said elements, a thrust measuring device mountable on and demountable from said housing as a self-contained structure and including a one-piece base plate adapted to be secured to said housing contiguous to said member, pressure responsive means mounted on said base plate and adapted to be operated to remove said member from its seat on said housing in opposite directions, said pressure responsive means including cells each comprising a diaphragm, a chamber closed by said diaphragm and adapted to contain fluid under pressure and a plunger cooperating with said diaphragm and adapted to be projected against said member to remove the same from its seat, and means for developing and indicating pressure in said chamber.

35. In a double acting thrust measuring device for a thrust bearing having relatively rotatable bearing elements, a housing for said elements and a rectilinearly movable member adapted to seat on said housing and sustain the thrust on said bearing elements, a thrust measuring device including a one-piece base plate adapted to be secured to said housing contiguous to said member, pressure responsive means mounted on said base plate and adapted to be operated in opposite directions to remove said member from its seat on said housing, said pressure responsive means including a plurality of cells adapted to receive fluid under pressure and plungers operated by said cells and adapted to engage said member and remove the same from its seat, and means for developing and indicating pressure in said cells, said base plate, cells, plungers and pressure developing and indicating means constituting a self-contained unit attachable to said housing.

36. In a thrust measuring device for a thrust bearing having relatively rotatable bearing elements, a housing for said elements and a rectilinearly movable member adapted to seat on said housing and sustain the thrust on said elements, pressure responsive means mounted on said housing and adapted to be operated to remove said member from its seat on said housing, and means cooperating with said member for preventing movement of said member by said pressure responsive means beyond a predetermined limit.

37. In a thrust measuring device for a double acting thrust bearing having relatively rotatable thrust bearing elements, a housing for said elements, a rectilinearly movable member adapted to receive and transmit the net of the oppositely acting thrusts exerted on said elements, means on said housing adapted to provide seats for said member, and a readily attachable and detachable self-contained pressure responsive unit attachable to said housing and adapted to be operated to develop pressure and remove said member from its seats in opposite directions and to sustain and indicate the net pressure exerted on said member.

38. In a thrust measuring device for a double acting thrust bearing having relatively rotatable thrust bearing elements, a housing for said elements, a rectilinearly movable member adapted to receive and transmit the net of the oppositely acting thrusts exerted on said elements, means on said housing adapted to provide seats for said member, and pressure responsive means cooperating with said member and adapted to remove the same from its seat for each direction of thrust, each of said pressure responsive means including one or more cells each provided with a diaphragm, a chamber closed by each diaphragm and adapted to contain a fluid under pressure and a plunger cooperating with each diaphragm and adapted to be moved into engagement with said member to remove the same from its seat, and means for developing and indicating pressure in said cell or cells.

39. In a thrust measuring device for a double acting thrust bearing having relatively rotatable thrust bearing elements, a housing for said elements, a rectilinearly movable member adapted to receive and transmit the net of the oppositely acting thrusts exerted on said elements, means on said housing adapted to provide seats for said member, means external of said housing for indicating the position of said member with respect to its seats, and pressure responsive means mounted on said housing and adapted to move said member off its seat for either direction of thrust, said pressure responsive means including means for indicating the magnitude of said net thrust when said pressure responsive means is sustaining the thrust of said member.

40. In a thrust measuring device for a double acting thrust bearing having relatively rotatable thrust bearing elements, a housing for said bearing, a rectilinearly movable member adapted to receive and transmit the thrust exerted on said bearing elements and means on said housing adapted to provide seats for said member, unitary means mounted on said housing for removing said member from its seat and measuring the thrust exerted thereon in either direction, said means including a plurality of cells for each direction of thrust and each cell comprising a diaphragm, a chamber closed by each diaphragm and adapted to contain fluid under pressure, and a plunger cooperating with each diaphragm and adapted to be moved into engagement with said member.

41. In a thrust measuring device for a thrust bearing having relatively rotatable thrust bearing elements adapted to sustain thrust in opposite directions, a housing for said elements, a single rectilinearly movable member adapted to receive and transmit the thrust exerted in either direction on said elements, means on said housing adapted to provide seats for said member, two sets of cells mounted on said housing for moving said member off of its respective seats, and means common to the cells of each set for developing pressure therein and measuring the magnitude of the pressure sustained thereby.

42. In a thrust measuring device for a thrust bearing having relatively rotatable bearing elements adapted to sustain thrust in opposite directions, a housing for said elements, a single rectilinearly movable member cooperating with said thrust bearing elements and moved in one direction or the other as the thrust is exerted in one direction or the other, means on said housing adapted to cooperate with said member and provide a seat therefor for each direction of thrust, and pressure responsive means mounted on said housing and adapted to remove said member from one or the other of its seats, said pressure responsive means including indicating means for measuring the magnitude of the thrust sustained thereby in either direction.

43. In a thrust measuring device for a thrust bearing having relatively rotatable bearing elements adapted to sustain thrust in opposite directions, a housing for said elements, a single rectilinearly movable member cooperating with said thrust bearing elements and moved in one direction or the other as the thrust is exerted in one direction or the other, means on said housing adapted to cooperate with said member and provide a seat therefor for each direction of thrust, means external of the bearing housing for indicating the position of said member, pressure responsive means for moving said member with respect to one or the other of its seats, and means for indicating the pressure on said pressure responsive means for each direction of thrust.

44. In a thrust measuring device for a thrust bearing having relatively rotatable bearing elements adapted to sustain the thrust in opposite directions, a housing for said elements, a rectilinearly movable member cooperating with said thrust bearing elements and moved in one direction or the other as the thrust is exerted in one direction or the other, means on said housing adapted to cooperate with said member and provide a seat therefor for each direction of thrust, and readily attachable and detachable pressure responsive means adapted to be mounted on said housing at one end thereof and including means for removing said member from either of its seats and indicating the pressure transmitted by said member in either direction of thrust.

45. In a thrust measuring device for a thrust bearing having relatively rotatable bearing elements adapted to sustain thrust in opposite directions, a housing for said elements, a single rectilinearly movable member cooperating with said thrust bearing elements and moved in one direction or the other as the thrust is exerted in one direction or the other, means adapted to cooperate with said member and provide a seat therefor for each direction of thrust, a pressure responsive device mounted on said bearing housing and including pressure cells adapted to remove said single member from each of its seats, and means for indicating the pressure in said cells.

46. In a thrust measuring device for a thrust bearing having relatively rotatable bearing elements adapted to sustain thrust in opposite directions, a housing for said elements, a rectilinearly movable member cooperating with said thrust bearing elements and moved in one direction or the other as the thrust is exerted in one direction or the other, means on said housing adapted to cooperate with said member and provide a seat therefor for each direction of thrust, a pressure responsive device mounted on said housing at one end thereof and including two sets of pressure cells, said sets of cells having means adapted to be projected into cooperative relationship with said member to remove the same from one or the other of its seats, and means for measuring the magnitude of the pressure existing in each set of cells.

47. In a thrust measuring device for a thrust bearing having relatively rotatable bearing elements adapted to sustain thrust in opposite directions, a housing for said elements, a rectilinearly movable member cooperating with said thrust bearing elements and moved in one direction or the other as the thrust is exerted in one direction or the other, means on said housing adapted to cooperate with said member and provide a seat therefor for each direction of thrust, a pressure responsive device mounted on said housing at one end thereof, said device including two sets of pressure responsive cells each of which includes a diaphragm, a chamber closed by said diaphragm and adapted to contain fluid under pressure, and a plunger adapted to be projected by said diaphragm, and means communicating with each of said sets of cells for developing pressure therein and operating said plungers to move said member from one or the other of its seats, said cells having pressure indicating means in communication therewith to measure the thrust exerted on said cells.

48. A thrust measuring device adapted to be mounted as a unit on one end of a thrust bearing housing, said device including a single base plate, a plurality of chambers formed in said plate, diaphragms closing said chambers, plungers cooperating with said diaphragms, means on said plate communicating with said chambers for developing pressure therein, a reservoir on said plate for storing fluid to be used in said chambers, and means on said plate for indicating the pressure existing therein.

49. A thrust measuring device adapted to be applied as a unit to a thrust bearing comprising a base plate, a sleeve at the axis of said plate adapted to be attached to a thrust transmitting member of said thrust bearing, a flange on said sleeve, a plurality of cells at each face of said base plate, each of said cells including a chamber adapted to contain fluid under pressure, a diaphragm for closing each chamber, and a plunger cooperating with each diaphragm, the plungers at one side of said base plate adapted to cooperate with said flange and the plungers at the opposite side of said base plate adapted to cooperate with the member to which said sleeve is attached, means for developing pressure in said chambers, and means for indicating the pressure existing in said chambers.

50. A thrust measuring device adapted to be mounted as a unit on a thrust bearing, said device including a base plate, a plurality of chambers formed in the opposite faces of said plate, diaphragms closing said chambers, plungers cooperating with said diaphragms, means communicating with the chambers at each face of said base plate for developing pressure therein, and means for indicating the pressure existing in the cells at each face of said base plate.

51. In a thrust measuring device for thrust bearings, a thrust measuring unit comprising a hollow threaded shank having a head thereon, a plunger mounted to reciprocate in said shank, and a pressure cell mounted in said head and cooperating with said plunger to sustain the thrust exerted thereon.

52. In a thrust measuring device for thrust bearings, in combination with a housing and relatively rotatable thrust bearing elements therein for receiving thrust in opposite directions, means for measuring the thrust exerted on said elements and including pressure responsive cells disposed at the same end of the bearing and adapted to sustain the thrust in each direction, means in said housing for transmitting the differential between the thrusts exerted in opposite directions on said elements to said cells, and means for developing and measuring pressure in said cells.

53. In a thrust measuring device for a thrust bearing having a housing, a thrust collar, thrust bearing elements adapted to cooperate with opposed faces of said collar and sustain the thrust in either direction and a single movable structure cooperating with the thrust elements at both sides of said thrust collar and mounted in said housing to transmit the net thrust acting on said bearing in either direction, fluid pressure cells cooperating with one end of said structure and provided with plungers adapted to receive the thrust exerted on said structure for each direction of thrust, and means for developing and indicating the pressure developed in said cells, said cells being also adapted for simultaneous co-operation with said structure to indicate reversals of thrust.

54. In a thrust measuring device for a thrust bearing having a housing, a thrust collar, thrust bearing elements adapted to cooperate with opposed faces of said collar and sustain the thrust in either direction and a single movable structure cooperating with the thrust elements at both sides of said thrust collar and mounted in said housing to transmit the net thrust acting on said bearing in either direction, a plurality of pressure cells adapted to cooperate with one end of said structure for each direction of thrust, and means in unitary relationship with said cells for developing and measuring pressure in said cells.

55. In a thrust measuring device for a thrust bearing having a housing, a thrust collar, thrust bearing elements adapted to cooperate with opposed faces of said collar and sustain the thrust in either direction and a single movable structure cooperating with the thrust elements at both sides of said thrust collar and mounted in said housing to transmit the net thrust acting on said bearing in either direction, two sets of pressure cells at one end of said structure respectively adapted to respond to pressure in opposite directions, means for transmitting pressure from said structure to one of said sets of cells for each direction of thrust pressure, and means for developing and measuring pressure in said sets of cells.

56. In a thrust measuring device for a thrust bearing having a thrust collar, thrust bearing elements adapted to cooperate with opposed faces of said collar and sustain the thrust in either direction and a single movable structure cooperating with the thrust elements at both sides of said thrust collar and adapted to transmit the net thrust acting on said bearing in either direction, means providing seats on which said structure is adapted to rest during the normal operation of the bearing for each direction of thrust, and pressure responsive means at one end of said structure for removing said structure from its seat for either direction of thrust and measuring the net thrust exerted on said structure.

57. In a thrust measuring device for a thrust bearing having a thrust collar, thrust bearing elements adapted to cooperate with opposed faces of said collar and sustain the thrust in either direction and a single movable structure cooperating with the thrust elements at both sides of said thrust collar and adapted to transmit the net thrust acting on said bearing in either direction, means providing seats on which said structure is adapted to rest during the normal operation of the bearing for each direction of thrust, two sets of pressure cells respectively adapted to cooperate with one end of said structure for either direction of thrust, and means associated with each set of cells for developing pressure therein to remove said structure from its seat and for measuring the thrust then transmitted to said cells.

58. A thrust measuring device for thrust bearings having thrust receiving elements and a member adapted to receive thrust from said elements and movable thereby, a thrust measuring unit mountable exteriorly of said thrust bearing and adapted to receive the thrust of said member, said unit comprising one or more cells each provided with a diaphragm and a chamber closed by said diaphragm and adapted to contain a fluid, means for transmitting the thrust of said member to said cell or cells, and means for developing and indicating fluid pressure in said cell or cells.

59. In a thrust bearing, in combination with a thrust collar, thrust bearing elements adapted to cooperate with the opposed faces of said collar and sustain the thrust in either direction and a movable member cooperating with the thrust elements at both sides of said thrust collar and adapted to transmit the thrust on said bearing elements, said member providing spaced radial surfaces, a thrust measuring device mounted between said spaced radial surfaces and including means for measuring the thrust on said member in each direction.

60. In a thrust bearing, in combination with a thrust collar, thrust bearing elements adapted to cooperate with opposed faces of said collar and sustain the thrust in either direction and a movable member cooperating with the thrust elements at both sides of said thrust collar and adapted to transmit the thrust on said bearing elements, said member providing spaced radial surfaces, a thrust measuring device mounted between said spaced radial surfaces and including two sets of oppositely facing pressure cells for cooperation with said radial surfaces to measure the thrust on said member in each direction.

61. In a thrust bearing, in combination with a thrust collar, thrust bearing elements adapted to cooperate with opposed faces of said collar and sustain the thrust in either direction and a movable member cooperating with the thrust elements at both sides of said thrust collar and adapted to transmit the thrust on said bearing elements, said member providing spaced radial surfaces, a thrust measuring device mounted between said spaced radial surfaces and including a base member, pressure cells carried thereby, and means communicating with said cells for indicating the magnitude of pressure developed therein.

62. In a thrust bearing, in combination with a thrust collar, thrust bearing elements adapted to cooperate with opposed faces of said collar and sustain the thrust in either direction and a movable member cooperating with the thrust elements at both sides of said thrust collar and adapted to transmit the thrust on said bearing elements, said member providing spaced radial surfaces, a thrust measuring device mounted between said spaced radial surfaces and including a base member, pressure cells carried thereby, and means carried by said base member for developing and indicating pressure in said cells.

63. In a thrust bearing, in combination with a thrust collar, thrust bearing elements adapted to cooperate with opposed faces of said collar and sustain the thrust in either direction and a movable member cooperating with the thrust elements at both sides of said thrust collar and adapted to transmit the thrust on said bearing elements, said member providing spaced radial surfaces, a thrust measuring device mounted between said spaced radial surfaces and including a plurality of pressure cells, each of said cells including a diaphragm, a chamber closed thereby and adapted to contain pressure fluid, and a member associated with said diaphragm and adapted to be projected thereby into thrust transmitting relationship with one of said radial surfaces, and means for developing and indicating fluid pressure in said cells.

64. In a thrust measuring device for thrust bearings having a bearing structure which includes thrust receiving elements, a housing therefor, a member adapted to receive thrust from said elements and means carried by said bearing structure and cooperating with said member to sustain the thrust on said bearing, a self-contained, readily attachable and detachable thrust measuring unit adapted to be mounted on said bearing structure and including a single pressure cell adapted to move said member off of said last named means, said cell having means in communication therewith for developing and measuring pressure within said cell.

65. In a thrust measuring device for thrust bearings having a bearing structure which includes thrust receiving elements, a housing therefor, a member adapted to receive thrust from said elements and means carried by said bearing structure and cooperating with said member to sustain the thrust on said bearing, a self-contained, readily attachable and detachable thrust measuring unit adapted to be mounted on said bearing structure, said unit including a base member, a single pressure cell mounted on said base member and adapted to move said thrust receiving member off of said sustaining means, and means on said base member in communication with said cell for developing and measuring pressure therein.

66. In a thrust measuring device for a thrust bearing, a pressure cell for transmitting pressure from a thrust transmitting element of said bearing to a liquid for measurement of the thrust by the pressure developed in said liquid, said cell comprising a member provided with a chamber having an open side, a non-metallic liquid-impervious deformable diaphragm closing said open side, means clamping the periphery of said diaphragm to prevent leakage therepast and providing an opening at the opposite face of said diaphragm from said chamber, a plunger operatively associated with said thrust transmitting element and slidably filling said opening, said plunger being engaged with the face of said diaphragm throughout the area of said opening and said diaphragm being deformable to maintain flat surface contact with the end of said plunger throughout the area of its end surface in the different positions of said plunger, and yielding means adjacent the opposite end of the plunger for guiding the movements of said plunger.

67. In a thrust measuring device for a thrust bearing, a pressure cell for transmitting pressure from a thrust transmitting element of said bearing to a liquid for measurement of the thrust by the pressure developed in said liquid, said cell comprising a member provided with a chamber having an open side, a non-metallic liquid-impervious deformable diaphragm closing said open side, means clamping the periphery of said diaphragm to prevent leakage therepast and providing an opening at the opposite face of said diaphragm from said chamber, an elongated plunger operatively associated with said thrust transmitting element and having an axially extended end bearing portion slidably filling said opening, said plunger being engaged with the face of said diaphragm throughout the area of said opening and said diaphragm being deformable to maintain flat surface contact with the end of said plunger throughout the area of its end surface in the different positions of said plunger, said plunger also having an intermediate portion of reduced cross section whereby it is out of frictional contact with the wall of said opening and an axially extending portion at the opposite end thereof from said diaphragm making sliding contact with the wall of said opening and cooperating with said first named end portion to maintain said plunger substantially at right angles to the normal plane of said diaphragm.

ALBERT KINGSBURY.